US008442030B2

(12) United States Patent
Dennison

(10) Patent No.: US 8,442,030 B2
(45) Date of Patent: May 14, 2013

(54) SOFTWARE CONTROL PLANE FOR SWITCHES AND ROUTERS

(75) Inventor: Larry R. Dennison, Walpole, MA (US)

(73) Assignee: Extreme Networks, Inc., Santa Clara, CA (US)

( * ) Notice: Subject to any disclaimer, the term of this patent is extended or adjusted under 35 U.S.C. 154(b) by 923 days.

(21) Appl. No.: 12/074,268

(22) Filed: Feb. 29, 2008

(65) Prior Publication Data

US 2008/0219268 A1 Sep. 11, 2008

Related U.S. Application Data

(60) Provisional application No. 60/904,259, filed on Mar. 1, 2007, provisional application No. 61/032,214, filed on Feb. 28, 2008.

(51) Int. Cl.
*H04L 12/28* (2006.01)
*H04L 1/00* (2006.01)
*H04L 12/56* (2006.01)

(52) U.S. Cl.
USPC ....... 370/351; 370/217; 370/395.53; 370/401

(58) Field of Classification Search ............ None
See application file for complete search history.

(56) References Cited

U.S. PATENT DOCUMENTS

| | | | |
|---|---|---|---|
| 6,947,428 B1 * | 9/2005 | Andersson et al. | 370/395.5 |
| 6,956,821 B2 * | 10/2005 | Szviatovszki et al. | 370/237 |
| 6,976,087 B1 | 12/2005 | Westfall et al. | |
| 2007/0047446 A1 | 3/2007 | Dalal et al. | |
| 2008/0049622 A1 * | 2/2008 | Previdi et al. | 370/237 |
| 2009/0310960 A1 * | 12/2009 | Xu | 398/4 |

FOREIGN PATENT DOCUMENTS

EP 1 065 858 A2 1/2001
WO WO 00/05853 A1 2/2000

OTHER PUBLICATIONS

Fedyk, D., et al., "GMPLS Control of Ethernet; draft-fedyk-gmpls-ethernet-pbb-te-00.txt," *IETF Standard-Working-Draft, Internet Engineering Task Force, IETF*, (Feb. 1, 2007).
Tomic, S., "Issues of Resource Management in Two-Layer FMPLS Networks with Virtual Network Services," *Global Telecommunications Conference, 2004, Globecom, 2004, IEEE* Dallas, TX, USA, Nov. 29-Dec. 3, 2004, Piscataway, New Jersey, USA, IEEE.

(Continued)

*Primary Examiner* — Faruk Hamza
*Assistant Examiner* — Cassandra Decker
(74) *Attorney, Agent, or Firm* — Blakely, Sokoloff, Taylor & Zafman LLP

(57) ABSTRACT

A Provider Network Controller (PNC) addresses the challenges in building services across Next Generation Network (NGN) architectures and creates an abstraction layer as a bridge, or glue, between the network transport and applications running over it. The PNC is a multi-layer, multi-vendor dynamic control plane that implements service activation and Layer 0-2 management tools for multiple transport technologies including Carrier Ethernet, Provider Backbone Transport (PBT), Multi-protocol Label Switching (MPLS), Transport MPLS (T-MPLS), optical and integrated networking platforms. Decoupling transport controls and services from the network equipment simplifies service creation and provides options for carriers to choose best-in-class equipment that leverages the PNC to enable rapid creation and management of transports and services. The PNC provides Service-Oriented Architecture (SOA) interfaces to abstract transport objects expressly designed to support both wholesale and retail services, and supports service offerings with varied bandwidth and Quality of Service (QoS) requirements, thus achieving enterprise Ethernet economics.

54 Claims, 21 Drawing Sheets

OTHER PUBLICATIONS

Partial International Search Report, PCT/US2008/002707 filed Feb. 29, 2008.
Jan. 28, 2009, International Search Report, PCT/US2008/002707.
Jan. 28, 2009, Written Opinion, PCT/US2008/002707.
RFC 4655 A Path Computation Element (PCE)—Based Architecture; http://www.ietf.org/rfc/rfc4655.txt. (Aug. 2006).
RFC 4657—Path Computation Element (PCE) Communication Protocol Generic Requirements—http://www.ietf.org/rfc/rfc4657.txt. (Sep. 2006).
RFC 4674 Requirements for Path Computation Element (PCE) Discovery—http://www.ietf.org/rfc/rfc4674.txt. (Oct. 2006).
SS7& Signaling Architecture http://www.cisco.com/univercd/cc/td/doc/product/tel_pswt/vco_prod/ss7_fund/ss7fun02.htm. (Sep. 22, 2008).
ITU-T Q.700 Introduction to CCITT Signaling System No. 7—http://www.itu.int/rec/T-REC-Q.700-199303-l/en. (Mar. 1993).
ITU-T Q.703 Signaling Link—http://www.itu.int/rec/T-REC-Q.703-199607-l/en. (Jul. 1996).
ITU-T Q.711 Functional Description of the Signaling Connection Control Part—http://www.itu.int/rec/T-REC-Q.711-200103-l/rn. (Mar. 2001).
Cisco Active Network Abstraction Fault Management User's Guide 3.5.1—www.cisco.com/en/US/docs/net_mgmt/active_network_abstraction/3.5.1/fault_management/user/guide.Fault. (May 2007).
Cisco Active Network Abstraction 3.5.2—http:/www.cisco.com/en/US/prod/collateral/netmgtsw/ps6504/ps8203/ps6776/prod_bulletin0900aecd80459714.pd (Mar. 2007).
Value Management Suite Datasheet—http://www.gridpointsystems.com/doc/Gridpoint_VMS_Datasheet.pdf (2008).
3400 Intelligent Node—http://www.gridpointsystems.com/doc/DataSheets/Gridpoint_3400_Datasheet_June08.pdf (2008).
Solving the Network Providers' Dilemma http://www.gridpointsystems.com/doc/Whitepapers/Network_Providers_Dilemma.pdf (2008).
Mobile Backhaul Tipping Point—http://www.gridpointsystems.com/doc/Whitepapers/Mobile_Backhaul.pdf (2008).
Gridpoint Connection Oriented Ethernet—http://www.gridpointsystems.com/doc/Whitepapers/Intelligent_Edge.pdf. (2008).
Hitless Planned Network Maintenance and Optimization in Connection Oriented Ethernet Networks—http://www.gridpointsystems.com/doc/Whitepapers/Hitless_Network_Maintenance_and_Optimization_in_COE_Ne. (2008).
Efficient Management at the Metro Edge—http://www.gridpointsystems.com/doc/Whitepapers/Efficient_Mgmt_at_the_Metro_Edge_June6.pdf. (2008).

* cited by examiner

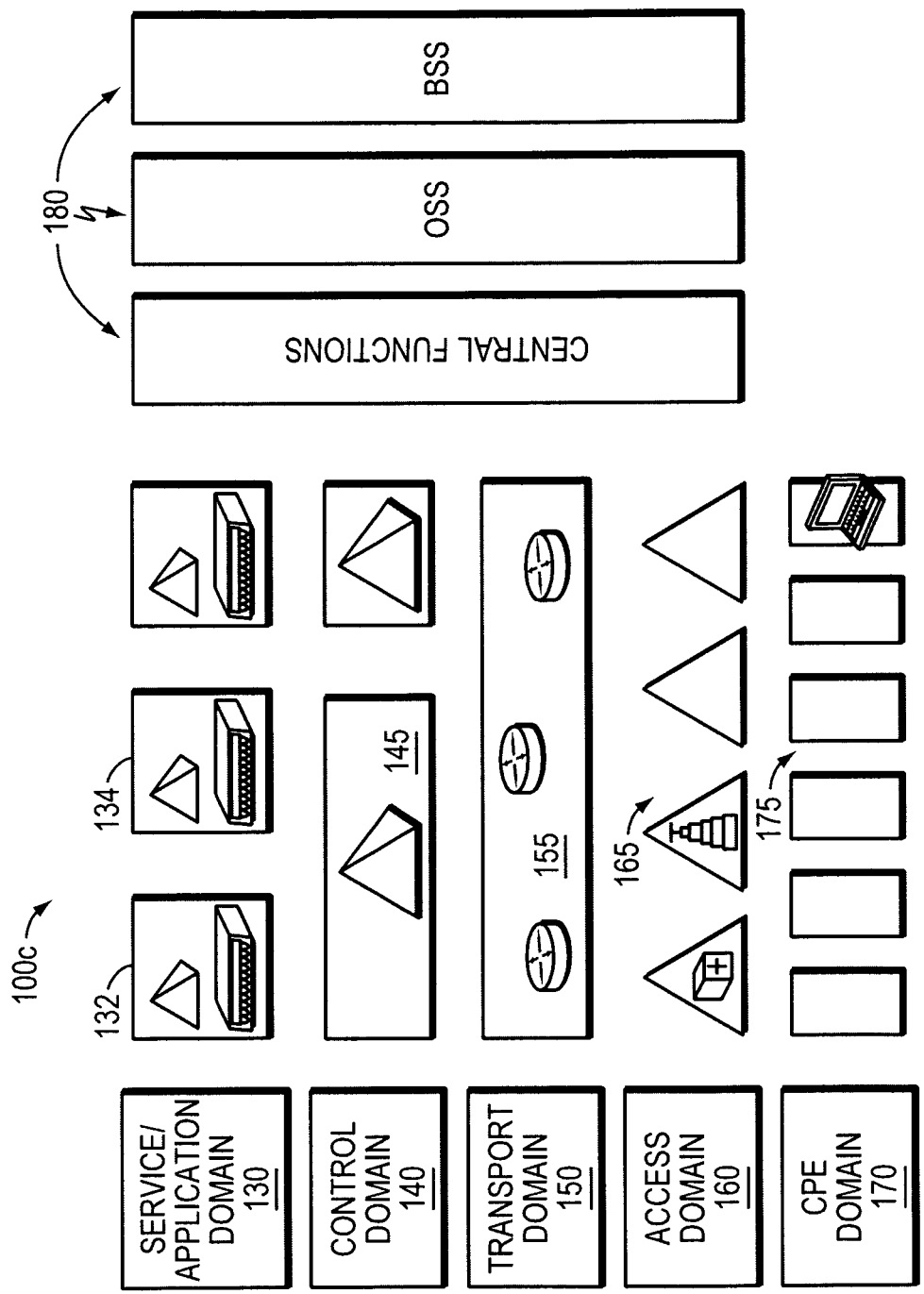

SOFTWARE CONTROL PLANE FOR SWITCHES AND ROUTERS

RELATED APPLICATIONS

This application claims the benefit of U.S. Provisional Application No. 60/904,259, filed on Mar. 1, 2007 and U.S. Provisional Application No. 61/032,214, filed on Feb. 28, 2008. The entire teachings of the above applications are incorporated herein by reference.

BACKGROUND OF THE INVENTION

The exponential growth of the Internet over the past several years has placed a tremendous strain on service provider networks. Not only has there been an increase in the number of users but there has been a multifold increase in connection speeds, backbone traffic, and newer applications. Initially, ordinary data applications required capability in a best-effort manner; but newer applications, like Virtual Private Networks (VPNs), voice, multimedia traffic, and real-time e-commerce applications, are pushing toward higher-bandwidth and better service guarantees. The major technologies currently in use that provide such Quality of Service (QoS) include Multi-Protocol Label Switching (MPLS) and Provider Backbone Transport (PBT).

Network operators are challenged by the radical shift in service revenue and technology that has occurred in the last two decades. In the late 1980s, nearly all service revenue was generated by wireline voice and leased-line services, based on traditional time division multiplexing (TDM) and Synchronous Optical Networking (SONET)/Synchronous Digital Hierarchy (SDH) or "circuit-switched" network infrastructures. By the late 1990s, it was clear that the growth of the Internet and the shift of business to packet-based services, including frame relay, Asynchronous Transfer Mode (ATM) and Internet Protocol (IP) services, would create a completely new revenue and service model.

Today, carriers are faced with increased competition in the "bit-pipe" business, a business model based purely on connectivity as a utility, but with both lower revenue and lower margins. The bit-pipe model, rather than emphasizing content and services, is driven by operational excellence. In order to maintain profits amidst declining revenues, carriers that adopt the bit-pipe approach are forced to reduce their operating costs, driven by IP technology, infrastructure consolidation, process automation, operational outsourcing and cutthroat competition. Further, carriers are looking to drive new top-line growth from a growing array of value-added services, such as managed business services, connection-oriented services, including Voice over IP (VoIP), IP Television (IPTV), and broadband Internet, and wholesale offerings, both out-sourced and insourced, as well as turning to smaller enterprise customers to fuel their financial future.

In doing this, carriers are adding to another dominant trend: customer demand for bandwidth in orders of magnitude greater than that consumed just a few years ago, and fueling the need for automated turnkey service offerings for small and medium enterprises outsourcing Information Technology (IT) to the carrier. As a result, carriers must find a way to satisfy customer demand for products by creating a portfolio that includes multiple and clearly-differentiated services, from the simplest bit-pipe through sophisticated applications, while increasing the automation through the entire service lifecycle. However, these services are layered over disparate physical infrastructures with different constraints. For example, in the metro aggregation, managing costs is critical with the increased availability of bandwidth. Service providers want to construct new services through component reuse instead of independent stovepipes, which requires that these applications utilize a common physical infrastructure.

As demand for packet services has grown and surpassed the demand for voice and circuit services, traditional carriers have found themselves operating separate circuit- and packet-switched networks. Further, the carriers' transition from bit-pipe to value-added service providers has forced them to rethink traditional models for service delivery across their transport networks. The current model, which tightly couples services to the underlying transport network, fails to deliver the flexibility needed by carriers for true service innovation. Carriers need a flexible framework that deals with service and transport independently. Further, economics are always a prime concern. Therefore, service providers have recognized the need to drive Ethernet enterprise economics and flexibility to carrier networks. Carriers want to create new revenue stream by creating new applications and adding new customers to existing services, in both the wholesale and retail markets. Moreover, carriers want to reduce costs through service automation and streamlining of regulatory compliance.

The major problem faced by the carriers is that networks do not have one topology, they have three: the "logical topology" of a service through which the endpoints can address each other; the "traffic topology" of a network showing the actual path that the traffic follows between those endpoints; and the "physical topology" of a network which is critical for availability management and recovery from failures. The loss of independent control of the three network topologies is not an academic issue.

A VPN is a private communications network often used within a company, or by several companies or organizations, to communicate confidentially over a public network. VPN traffic can be carried over a public networking infrastructure (e.g., the Internet) on top of standard protocols, or over a service provider's private network with a defined Service Level Agreement (SLA) between the VPN customer and the VPN service provider.

VPNs can be a cost-effective and secure way for different corporations to provide users access to the corporate network and for remote networks to communicate with each other across the Internet. VPN connections are more cost-effective than dedicated private lines; usually a VPN involves two parts: the protected or "inside" network, which provides physical and administrative security to protect the transmission; and a less trustworthy, "outside" network or segment (usually through the Internet). Generally, a firewall sits between a remote user's workstation or client and the host network or server. As the user's client establishes the communication with the firewall, the client may pass authentication data to an authentication service inside the perimeter. A known trusted person, sometimes only when using trusted devices, can be provided with appropriate security privileges to access resources not available to general users.

A well-designed VPN can provide great benefits for an organization. It can extend geographic connectivity, improve security where data lines have not been ciphered; reduce transit time and transportation costs for remote users; reduce operational costs versus traditional Wide Area Network (WAN); simplify network topology in certain scenarios; provide global networking opportunities, telecommuter support, broadband networking compatibility, and faster return on investment than traditional carrier leased/owned WAN lines, show a good economy of scale, and scale well when used with a public key infrastructure.

To make connections, a VPN may use tunnels. Tunneling is the transmission of data through a public network in such a way that routing nodes in the public network are unaware that the transmission is part of a private network. Tunneling is generally done by encapsulating the private network data and protocol information within the public network protocol data so that the tunneled data is not available to anyone examining the transmitted data frames. Tunneling allows the use of public networks (e.g., the Internet), to carry data on behalf of users as though they had access to a "private network," hence the name.

Carriers use MPLS to direct the flow of traffic in their networks. MPLS is well-suited for use in tunneling for VPNs because it provides traffic isolation and differentiation without substantial overhead. MPLS is a data-carrying mechanism which emulates some properties of a circuit-switched network over a packet-switched network by setting up a specific path for a given sequence of packets, identified by a label placed in each packet. MPLS is protocol-independent and can be used to carry many different kinds of traffic, including IP packets, as well as native ATM, SONET, and Ethernet frames.

MPLS works by prepending packets with an MPLS header, containing one or more "labels." This is called a label stack. Iincoming data packets are assigned a label by a Label Edge Router (LER) and then forwarded along a Label Switch Path (LSP).

During its routing, the contents of the packet below the MPLS label stack are not examined. Along a LSP each Label Switch Router (LSR) forwards a packet based solely on the instructions of the topmost label on the stack. At each hop, the LSR strips off the existing label and applies a new label which informs the next hop of how to forward the packet. LSP is enforced at every hop along the data path such that a secure path is provided across an IP cloud. Specific IP tunnels can be created throughout a MPLS network for an individual customer without the need for encryption or end-user applications. Finally, the LER at the destination removes the label and delivers the packet to the destined address.

At the egress LER, the last label has been removed such that only the payload remains. This can be an IP packet, or any of a number of other kinds of payload packet. The egress router must therefore have routing information for the packet's payload, because it must forward it without the help of label lookup tables.

In addition to faster forwarding of traffic, MPLS makes it easy to manage a network for QoS. Internet Service Providers (ISPs) can better manage different kinds of data streams based on priority and service plans. For instance, customers that subscribe to a premium service plan, or customers that receive a large amount of streaming media or high-bandwidth content, may experience minimal latency and packet loss.

However, MPLS's operation is intertwined with IP and consequently may inherit much of the adaptive behavior issues, congestion and security problems associated with IP. Consumer traffic variations can impact network load and performance even for business services. Thus, there is a constant risk of congestion-induced service failure, where network load is high and the traffic is bursty. Therefore, a critical value proposition was undermined in the quality of the customers' total experience. Moreover, although packet networks provide adaptive behavior to increase resiliency, IP lacks the predictability of circuits because operators cannot easily determine the paths taken by their customers' critical data.

PBT is a set of enhancements to Ethernet technology that allows use of Ethernet as a carrier class transport network. Ethernet is a large diverse family of frame-based computer networking technologies for local area networks (LAN), and defines a number of wiring and signaling standards for the physical layer through means of network access at the Media Access Control (MAC) layer. The MAC layer provides a 48-bit addressing mechanism called a MAC address, which is a unique serial number assigned to each network adapter, making it possible to deliver data packets to a destination within a network.

The key standard in Ethernet architecture is Provider Backbone Bridge (PBB), standardized as Institute of Electrical and Electronics Engineers (IEEE) 802.1ah. This standard incorporates encapsulation based on MAC addresses, often called "M-in-M" or "MAC-in-MAC" encapsulation. PBT uses the concepts of Virtual Local Area Network (VLAN) tagging, as per IEEE standard 802.1Q, Q-in-Q as per IEEE 802.1ad and MAC-in-MAC as per IEEE 802.1ah to expand the number of "service VLANs" that can be supported on the network, but disables the concept of flooding/broadcasting and spanning tree protocol. PBT uses Ethernet for connection-oriented purposes, as is the case with present Synchronous SDH and SONET transport, by stripping down the complexity involved with the present Ethernet LAN. PBT simplifies the Operational Administration and Maintenance (OA&M), as in the SDH/SONET world, by using additional extensions based on IEEE 802.1ag, and provides extensions so as to provide path protection levels similar to the Unidirectional Path Swtiched Ring (UPSR) protection in SDH/SONET network.

The packets are forwarded based on outer VLAN Identifier (VID) and Destination MAC address. Path protection is provided by using one work and one protect VID. In case of work path failure, as indicated by loss of 802.1ag continuity check (CC) messages, the source node swaps the VID value to redirect the traffic onto the preconfigured protection path within 50 ms.

Currently there exists no means for composing a tunnel through mixed networks employing MPLS and PBT as there exists no technology that provides an interface between MPLS and PBT networks.

SUMMARY OF THE INVENTION

A Provider Network Controller (PNC) addresses the challenges in building services across today's evolving network infrastructure. The PNC provides a comprehensive state-of-the-art multi-layer, multi-vendor dynamic control plane and implements service activation and Layer 0-2 management tools for multiple transport technologies, including Carrier Ethernet, Provider Backbone Transport (PBT), Multi-Protocol Label Switching (MPLS), Transport MPLS (T-MPLS), optical and integrated networking platforms. The PNC is technology-agnostic and designed for networks that encompass single or multiple switch technologies. The PNC bridges the gap between the physical networks and the software infrastructure of Next Generation Network (NGN) architectures by providing Service-Oriented Architecture (SOA) interfaces to cleanly abstract transport objects that are expressly designed to support both wholesale and retail services.

One of the important functions of PNC is path computation and the associated network planning and optimization functions. In addition to simple best-effort shortest path routing, the PNC can perform complex path computations involving a variety of constraints and equipment limitations (e.g., bandwidth, delay, jitter, latency, lawful intercept, and other constraints dictated by network policy rules). Constrained optimization problems require knowledge of the state of the entire network and are consequently ideally suited to a separate dynamic control plane. The PNC uses a combination of algorithmic, heuristic, and rule-based approaches to route each flow subject to the service constraints and limitations of the network equipment. The PNC is inherently designed to operate in a multi-layer, multi-service, multi-vendor, multicarrier environment.

Path computation in the PNC is performed by a Path Computation Module (PCM). The PCM is a highly-optimized multi-threaded module capable of routing, for example, 3 thousand flows per second in a 100 node network in its base (singlethreaded) configuration. The path computation functions are designed to streamline and automate the operation of the network while providing the highest levels of scalability and reliability and allowing implementation of complex network policies; The primary task of the PCM is to apply traffic engineering rules and network policies against the network topology to optimally route each service across the network. The PCM keeps track of all the flows that have been routed in the network. It also maintains a database storing data for each node and link of the flows that have been routed through that element, as well as the associated capacities, utilizations, and performance metrics for that element.

The flexibility and economics of Carrier Ethernet can be exploited by leveraging a network controller that is the glue between network transport and service layers, supporting a range of service offerings with varied bandwidth, Quality of Service (QoS) requirements—thus achieving enterprise Ethernet economics. Decoupling transport controls and services from the network equipment simplifies service creation and provides options for carriers to choose best-in-class equipment that leverage a centralized control plane to enable rapid creation, management of transports and services.

An example network controller and corresponding method, which may be fully-automated, control services in a communications network by means of a software control plane system. The communications network may be a multi-layer, mutli-service, multi-vendor or multi-carrier communications network. The controller stores in a database information about hardware endpoints, which may include switches and routers and communications connections in the communications network, and traffic engineering rules and network policies governing the communications network. The information may include capacity, utilization and performance metrics.

A path computation module of the example network controller computes communications paths, which may include tunnels according to the stored information to implement the defined services. The path computation module further programs hardware endpoints along the computed communications paths to establish the communications paths in the communications network and monitors programmed hardware endpoints and communications connections. The path computation module updates the stored information and recomputes communications paths and reprograms hardware endpoints along the recomputed communications paths to adapt the communications paths according to changes in the stored information and services to ensure implementation of the services.

Further, the path computation module further may compute communications paths according to attributes, which may include service performance, including frame latency, delay variation and loss ratio, and bandwidth profile stored in a database defining the services to be implemented on the network. The path computation module may override normal behaviors of the hardware endpoints to program hardware endpoints along the computed communications paths and may monitor the programmed hardware endpoints and communications connections along the computed communications paths for network faults, overloads or path optimization.

Moreover, the path computation module may compute communications paths and reprogram hardware endpoints along the recomputed communications paths to adapt the communications paths according to changes in the attributes of the defined services to ensure implementation of the services. The path computation module may optimize hardware endpoints and communications connections in the communications network according to quality of service and per-class bandwidth constraints.

Moreover, the path computation module may recompute the communications paths according to an economic or social value associated with the communications paths. The path computation module may recompute the communications paths and reprogram hardware endpoints along the recomputed communications paths to restore communications paths in the communications network in the event of a failure of at least one of the communications connections in the computed communications paths. The communications connections may have underlying communications protocols such that the path computation module may emulate the underlying communications protocol of computed communications paths using communications connections in the communications network having underlying communications protocols different from the underlying communications protocol of the communications path. The path computation module may recompute the communications paths and reprogram hardware endpoints along the recomputed communications paths to optimize the communications path for each service in the communications network according to the stored information.

The path computation module may dynamically adjust associated restoration time constants of the communications paths according to the respective restoration time constants of the communications connections of the recomputed communications paths. The network controller further may migrate services from the computed path to the recomputed path, optionally to allow maintenance of hardware endpoints and communications connections in the communications network without disruption to services.

A further example embodiment is a method for restoring communication tunnels in a network, such as the network of the first concept. Currently, other methods of network optimization exist, but they cannot perform rapid restoration of services. MPLS does not perform optimization and does not note reasons for establishing a particular network (e.g., lowest cost bandwidth available), but rather only knows the order of connections that were established. Further, those methods for optimization do not know how to perform restoration.

Another example embodiment is a method for emulating communication tunnels in a network. According to the method, a communication tunnel is allocated having a first underlying communication protocol and multiple hardware endpoints. The tunnel is then connected to other communication tunnels having underlying communication protocols different than the first protocol by directly programming the hardware endpoints of the communication tunnel.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1C is an abstract block diagram illustrating the NGN architecture.

DETAILED DESCRIPTION OF THE INVENTION

A description of example embodiments of the invention follows.

Figures 1A, 1B:
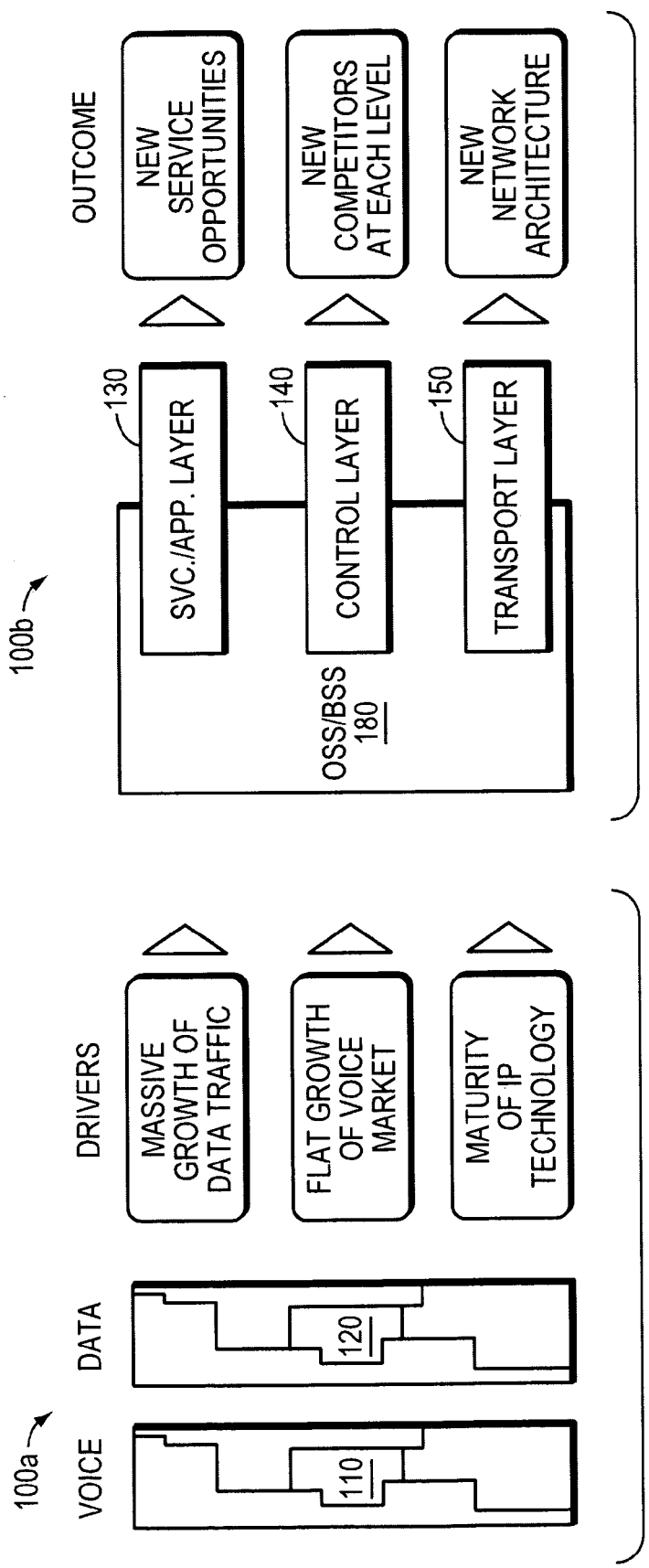
FIGS. 1A-1B are abstract block diagrams illustrating the architectures of traditional voice and data networks and a Next Generation Network (NGN) architecture, respectively.

FIG. 1A is an abstract block diagram illustrating the architectures 100a of traditional voice 110 and data 120 networks used by carriers. Over time, the relative importance of the different networks has shifted. Therefore, the massive growth of data traffic over data networks 120, the flat growth of voice traffic over voice networks 110, and the maturity of Internet Protocol (IP) technology has caused carriers to assess their systems and predict what services their networks will need to support and the type of competition they will face in the future. The overall conclusion is that the architecture 100a of traditional networks needs to change to allow operators to address the market effectively and compete in the new environment. This has driven the International Telecommunication Union (ITU) to develop a Next Generation Network (NGN) architecture to enable delivery of a wide range of telecommunication services over a single packet-based infrastructure.

FIG. 1B is an abstract block diagram illustrating the architecture 100b of an NGN. The NGN architecture 100b is built around "building block" layers: a service/application layer 130, where the bulk of services are defined; a control layer 140, which represents a software system such as IP Multimedia Subsystem (IMS); and a transport layer 150, which is responsible for the physical transport of data. All three layers 130, 140, 150 use some common components 180, as represented by the Operations Support System (OSS)/Business Support System (BSS). The NGN architecture 100b uses multiple broadband, Quality-of-Service (QoS)-enabled transport technologies and makes service-related functions independent from the choice of underlying transport technologies.

FIG. 1C is an abstract block diagram illustrating the NGN architecture. The layers 130, 140, 150, 160, 170 represent how the carriers think about their network architecture 100c. Transport 150 is the entire physical infrastructure 155, while access 160 and Customer Premises Equipment (CPE) 170 represent the fan-out of the physical network 165, 175 to reach customers. Above that is the control domain 140, where systems like IMS 145 reside. Further above are the actual end applications 130, such as voice telephony 132 and internet access 134.

Figure 1E:
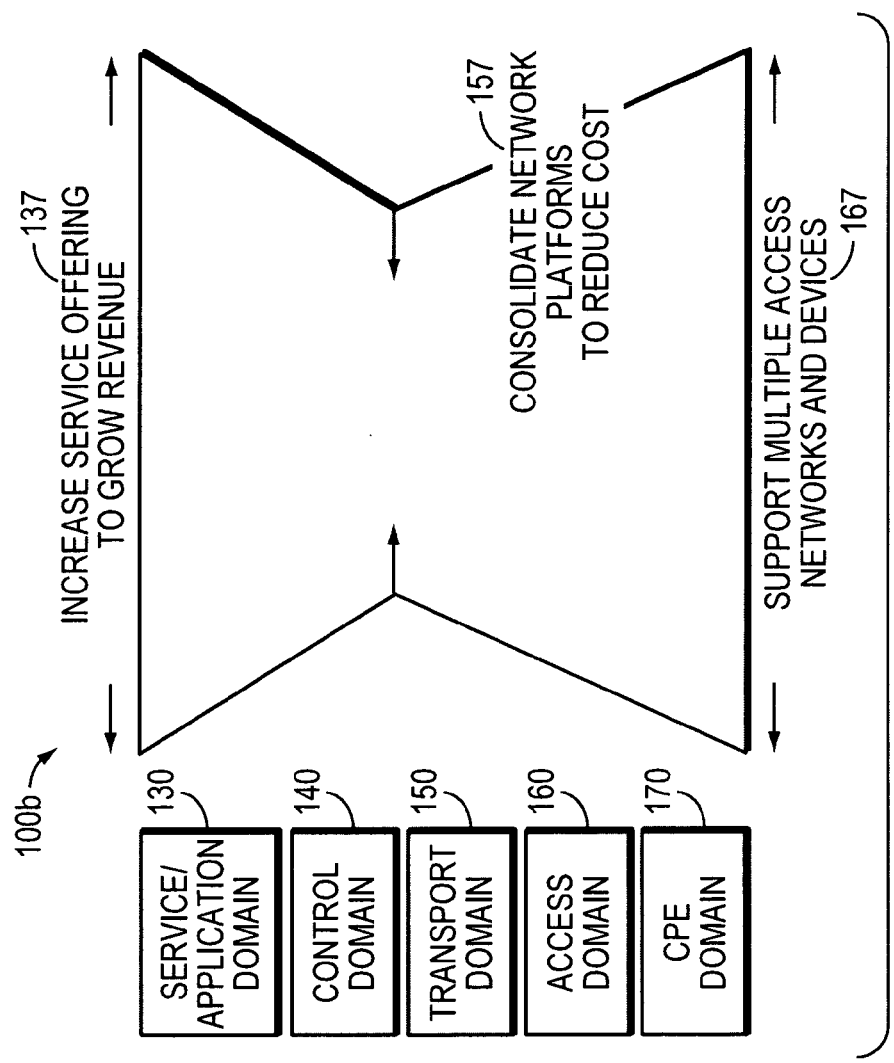
FIGS. 1D-1E are abstract block diagrams illustrating greater detail of the architectures of traditional voice and data networks and the NGN, respectively.
Figure 1D:
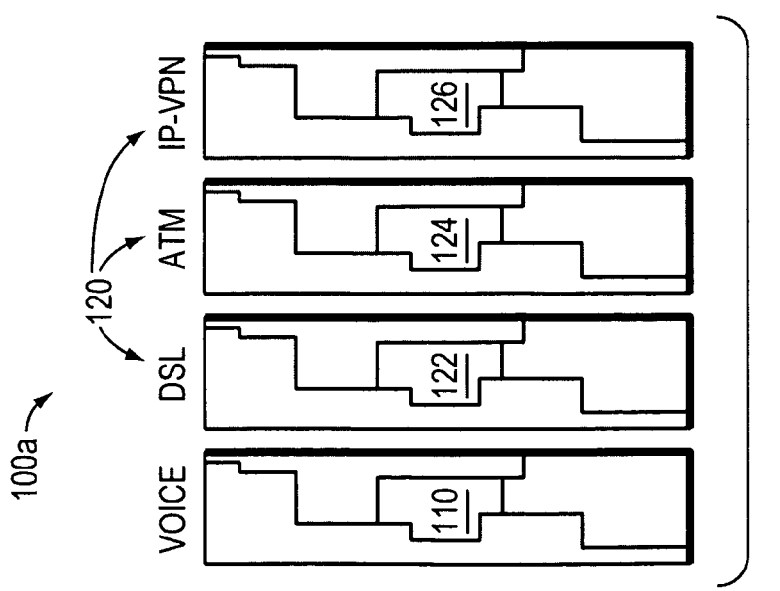

FIG. 1D is an abstract block diagram illustrating greater detail of the architectures 100a of traditional voice 110 and data 120 networks. From the original circuit-switched voice network 110 in the Public Switched Telephone Network (PSTN) architecture, the stovepipe architecture 100a has expanded as new services have been developed such that each service, such as voice 110, digital subscriber line (DSL) 122, Asynchronous Transfer Mode (ATM) 124 and Virtual Private Networking (VPN) 126, has its own dedicated or overlay network to carry it. The result is that numerous services need to be delivered to an increasing range of access devices.

FIG. 1E is an abstract block diagram illustrating the NGN architecture 100b. The NGN architecture 100b construct new services with the potential of unbundled services at each layer and the ability to move to new network architectures. Particularly, the NGN architecture 100b frees telephony providers from the constraints and costs of the stovepipe architecture 100a of FIG. 1D. In response to the carriers' need to increase service offerings (e.g., Service/Application Domain 130) 137 to grow revenue as well as pressures to support multiple access networks (e.g., Access Comain 160) and devices (e.g., CPE Domain 170) 167, carriers are seeking to consolidate the number of platforms in the "middle" of the network (e.g., Transport Domain 150) 157. Thus, convergence is effectively being driven by pressure from the top (i.e., the services offered) 137 and from the bottom (i.e., the access devices available) 167.

Figure 1F:
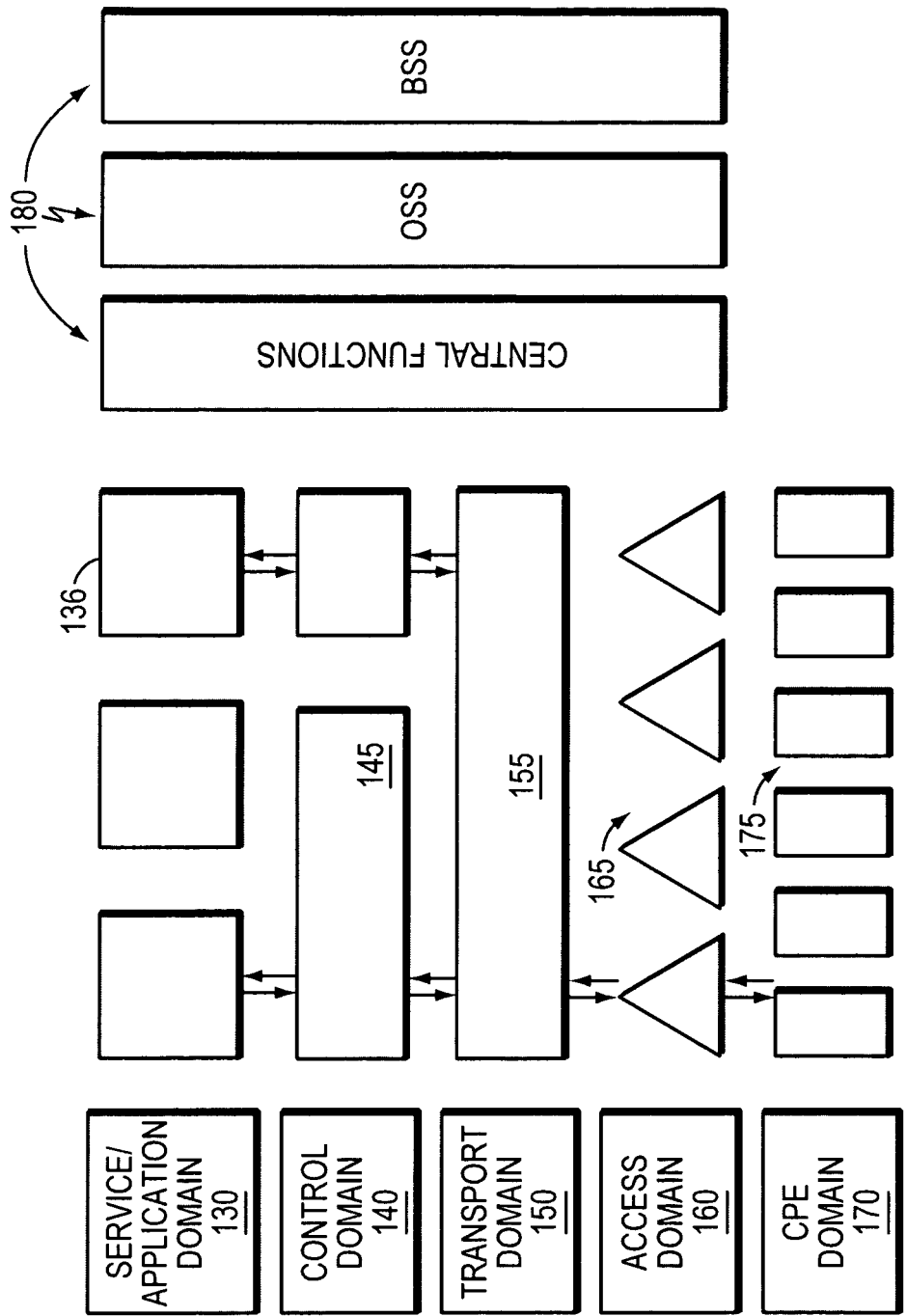
FIG. 1F is an abstract block diagram illustrating the NGN architecture and challenges faced by carriers in its implementation.

FIG. 1F is an abstract block diagram illustrating the NGN architecture and challenges faced by carriers in its implementation. Today there is a lack of general Service Level Agreement (SLA)-aware Application Programming Interfaces (APIs) enabling service elements to specify attributes such as bandwidth, failure recovery procedures, and delay characteristics in the transport domain 150. To run properly on NGNs, services require clear APIs at the boundaries of each layer that can instruct the transport 150 and control 140 layers of the network how to treat different types of traffic. This significantly improves a carrier's ability to deliver on rapid application (services) introduction, and adapt to the changing nature of services demand and delivery challenges. For example, for applications such as gaming, the ability to define characteristics, such as jitter and packet lose, is essential. New services require absolute parameters on a service-by-service basis, rather than the traditional, generalized bronze, gold and platinum service levels. With diversification of services there must be somewhere on the network where service arbitration can occur. The absence of global resource arbitration invites over-commitment of the network. Further, absence of resource arbitration policies creates risk to high-value services. Resource arbitration must be done centrally and brought into a distributed network.

Further, to protect physical assets, particularly in the transport 150 and access 160 layers, from "value exploitation" by competitors 136 in the service layer 130, viable standard APIs are necessary.

Carriers also wish to leverage the transport network 150, in which they have invested heavily, to increase revenue opportunities. To achieve this, carriers want to couple the transport network 150 to the services 130 it delivers to create a hybrid service offering that is differentiated from the competition 136. A further issue for carriers is that services 130 compete with each other for resources in the transport layer 150 because there is a lack of a centralized "service-centered" intelligence in the IP-based transport layer 150. Thus, to enable effective management of different services 132, 134, 136 as they move over the transport network 150, service intelligence is needed.

Moreover, in the migration from legacy service to NGN-framework services, there is a challenge in maintaining "touch" within the OSS 180. For example, carriers may be running Frame Relay and ATM networks that support high end, "high touch" service valued by business customers. While the carriers wish to migrate from expensive Frame Relay and ATM networks to lower-cost IP networks, they cannot afford to lose the ability to deliver legacy "high touch" offerings. Therefore, a service provider loses "touch" with the traffic and does not always know where a particular packet is or exactly how it will behave. For this reason, the end customers are reluctant to move from legacy ATM to IP.

In addition, high value services need to be able to communicate their requirements to the network regarding procedures, such as failure recovery, so that the system restores the most-important service first. Ultimately, carriers wish to link business needs with the operation of the network. However, at the same time, the network continues to evolve from IP, to IP over Multi-Protocol Label Switching (MPLS), and now to lower-cost technologies, such as Provider Backbone Transport (PBT) and Ethernet. A further complicating factor is the number of devices in the network, from multiple vendors, or different ages, and with different capabilities. The is a need to reconcile the technologies and capabilities comprising the network in order that services can make optimum use of it.

This transition to packet services has presented special challenges to operators and customers used to circuit-based behavior. Circuits are "stateful" and set up along specific paths. Knowing those paths makes it easier for a carrier to protect against and quickly react to and repair node and link failures. Circuit switching manages congestion purely through admission control because trunk bandwidth is allocated end to end. Packet services, however, require traffic and congestion management that becomes more complex as the size of the network increases.

Carriers seek technology-agnostic services and applications. For example, a Voice over IP (VoIP) carrier simply wants an IP call to go through and does not care whether it is carried over an MPLS, Ethernet or native IP link. Carriers also want to be able to control multiple services via, for example, IMS, and to manage future services via the same architecture. Additionally, consolidation is taking place at the transport layer utilizing technologies such as IP/MPLS, Ethernet PBT and all-optical networks. At the other end of the spectrum, network access methods are diversifying with technologies, such as WiFi, Radio Access Network (RAN), and CPE devices. Carriers are implementing centralized provisioning processes, such as Authentication, Authorization, and Accounting (AAA), and subscriber and policy management based on SLAs. These processes are based on building blocks that can be reused or reconfigured to meet changing needs.

Further, compliance with regulatory requirements, such as fair access, presents concerns for carriers over monetizing service-oriented infrastructure. Security issues also present concerns to carriers regarding isolation of user data and protection of network information from competitors.

Carrier Ethernet presents an opportunity for carriers to position their services to their greatest advantage. To the retail customer, Ethernet is a convenient, familiar and cost-effective packet transport technology. To the carrier serving that customer, Carrier Ethernet is an opportunity to offer a simple and useful baseline upon which tiers of value-added services, ranging from IP services to VoIP, can be built. Because Carrier Ethernet is transport agnostic, the carrier has complete freedom to evolve or build out its Layer 0/1 infrastructure in whatever way it deems best. Carrier Ethernet has similar value in wholesale services. There the tiers of service begin dark fiber, possibly followed by lambdas and then, for example, a framed Layer 1 service, such as Synchronous Optical Networking (SONET). These characteristics and Carrier Ethernet's support for precise SLAs makes it an excellent basis for wireless backhaul and similar applications in which a single Ethernet Virtual Circuit can span a carrier's metropolitan and long-haul infrastructure regardless of what combination of Layer 0/1 technologies may be in use.

Ethernet interfaces have been used on routers and other packet equipment for years, but there is a major difference between a point-to-point Ethernet mission and a "traffic topology" mission. Ethernet was developed as a standard for Local Area Networks (LANs) and presented major issues in terms of scalability and suitability for carrier operations. Ethernet's limits on the number of Virtual LANs (VLANs) that can be present in a single network makes it difficult for carriers to support as many customers as they'd like without resorting to non-standard means. In addition, as an enterprise technology, Ethernet did not include Operation, Administration, and Maintenance (OA&M) functions found in carrier technologies such as SONET, nor did it provide SONET's rapid fail-over capability. Finally, while plug-and-play operation is often desirable for enterprise operation, it is easy and automated traffic engineering that is notably more important to carriers, especially when they have SLAs to meet.

There are a number of standards groups working on Carrier Ethernet issues, including the Institute of Electrical and Electronics Engineers (IEEE), the ITU, the Internet Engineering Task Force (IETF) and the Metro Ethernet Forum (MEF). The activity has expanded as service provider interest in Ethernet evolved from a simple service interface to an architecture for a Carrier Ethernet ecosystem. The MEF developed five critical attributes for a Carrier Ethernet architecture and has worked to develop complete solutions in each area. The primary requirements are: (1) standardized services through the use of technology-neutral abstractions of service behavior; (2) scalability to metro, national and even global deployment to insure providers there is no risk of outgrowing a Carrier Ethernet investment; (3) reliability to ensure an Ethernet layer would contribute to greater network availability; (4) QOS to ensure Carrier Ethernet could support the full range of service offerings currently available, many of which demand managed QoS and stringent service-level agreements; and (5) service management to ensure Carrier Ethernet could be linked to service and operation processes, thus supporting effective and efficient Operation, Administration, Maintenance, and Provisioning (OAM&P).

Carrier Ethernet still needs to turn one of its promises into reality: relief from the problems of spanning trees and traffic engineering. The basic spanning tree protocol (STP) of Ethernet had already been augmented to Rapid Spanning Tree Protocol (RSTP) and Multiple Spanning Tree Protocol (MSTP), but these still create data plane and control plane constraints on the size and complexity of the Carrier Ethernet network. It is in this area that a debate among standards groups, providers, and equipment vendors has emerged. One side has promoted PBT as an extension of Carrier Ethernet and the other a variation on MPLS called Transport MPLS (T-MPLS).

PBT is an evolution from other Carrier Ethernet technology and is easily introduced into many Carrier Ethernet products. PBT is an "under-IP" service framework that avoids adaptive and relatively unpredictable IP behavior and can be leveraged to deliver high-value services at reduced cost compared to existing solutions. PBT builds upon IEEE 802.1 to support the use of provisioned point-to-point tunnels to link elements of Layer 2 VPNs linking the pieces of Ethernet Line (E-LINE), Ethernet LAN (E-LAN), or Ethernet Tree (E-TREE) services. In PBT, the generation of spanning tree updates is suppressed. As a result, there is no control plane behavior to build a bridging table. Instead, bridging tables are built using an external management system. Just as PBT is an extension to Ethernet technology, T-MPLS is an extension to router technology. However, routers are typically more expensive than Ethernet switches. Therefore, PBT is lower in cost to implement, unless the network already supports routing.

To make PBT a basis for service elements it needs to be a part of an open control plane. Carries do not want yet another control plane that is solely for PBT. Providers want an open control plane concept compatible with other network technology, such as IP. However, countering this shift is the desire of equipment vendors to retain the control plane within their systems as a barrier to low-cost competitors. Although PBT is emerging as a low-cost, high-touch alternative, carriers have already adopted MPLS and invested in equipment to support it.

PBT behaves as a policy-less data plane. Therefore, the carrier's business policies (i.e., relationships between providers, and providers and their customers) should define network policy. Business policies should flow down into the network. The natural order is to achieve agreement between business parties, with each pushing its policy into the network. Currently, there exists no abstraction that enables this flow of information. Even worse, today's protocols require business policy exchange at the network layer.

PBT and T-MPLS have various approaches in common and their technical capabilities are substantially the same. Both of the suggested enhancements to the Carrier Ethernet framework create an alternative to Provider Backbone Bridging (PBB). Both have a specific "edge" and form a network-within-a-network with special internal behavior. Both also create a more manageable control plane architecture based on something other than the usual topology update messages. Supporters of PBT and T-MPLS also agree that a Generalized MPLS (GMPLS) control plane architecture should be used and, very importantly, that there must be a connection-oriented transport technology layer as Layer 2 of provider packet networks.

GMPLS's role as a control plane for both architectures stems from its roots as a control plane for optical routing. Because optical devices do not exchange topology information, GMPLS assumes this information can be gathered through a separate control plane layer using standard discovery protocols to learn topology. The results are then fed downward to lower layers to manipulate connection behavior allowing considerable control over the conditions that result in updating the topology. It is also possible to gain topology awareness from a higher-layer control plane exchange such as the one already used for IP/MPLS. The key requirement for GMPLS is the correspondence between the nodes and trunks in the control plane and the data plane so the topologies below can be correctly represented. The PBT/T-MPLS debate may be an indication that the issue of topology and configuration management by an independent higher-level control plane is of general importance to operators.

Carrier Ethernet inherits the full range of Ethernet OAM&P enhancements, including the IEEE 802.1ag OA&M Connectivity Fault Management features and Ethernet Protection Switching, standardized in ITU Recommendation G.8031 SG15. The former provides frame loss, delay and jitter information, as well as service availability and utilization information. Unlike MPLS Label Switch Paths (LSPs), which are difficult to trace internally, Carrier-Ethernet paths can be traced for troubleshooting and are not impacted by adaptive routing changes. This allows fail-over paths to be pre-calculated, if desired. These capabilities, along with PBT, make it possible to write exceptionally stringent SLAs for Carrier Ethernet services, thereby resolving one of the major provider problems with enterprise services based on IP and MPLS. Similarly, Carrier Ethernet's immediate, automated fault detection notices network problems as soon as they occur.

PBB Traffic Engineering (PBB-TE), specified in IEEE 802.1Qay, is a technology that helps advance Carrier Ethernet. PBB-TE enables the creation of connection-oriented Ethernet tunnels that allow service providers to offer Time-Division Multiplexing (TDM) circuit-like services with deterministic performance characteristics. It is designed to meet or exceed the functionality currently deployed by tunneling technologies (e.g., MPLS) but at Ethernet cost points and with simplified control and management. PBB-TE elicits a connection-oriented forwarding mode from the existing switches by effectively "turning off" certain Ethernet features, such as broadcasting, Media Access Control (MAC) address learning and Spanning Tree functionality, without introducing new complex/expensive network technologies. However, certain obstacles need to be removed in order for that to occur: (1) the lack of a control plane in the PBB-TE equipment; and (2) the need to support all types of business services under PBB-TE.

Figure 2:
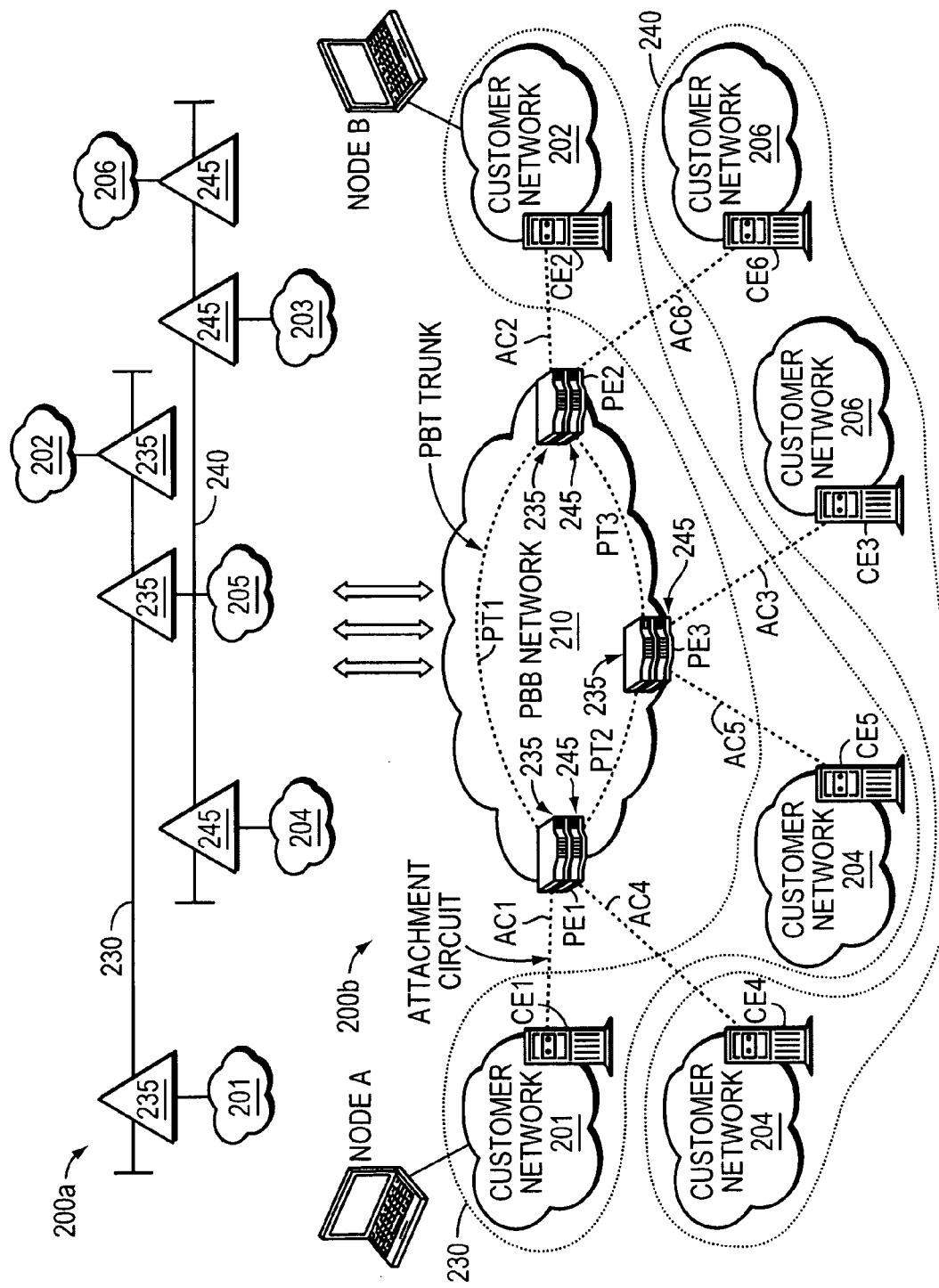
FIG. 2 is a network diagram illustrating a prior art example Ethernet Local Area Network (E-LAN) service deployment in E-LAN instance and network topology form.

FIG. 2 is a network diagram illustrating a prior art example E-LAN service deployment in E-LAN instance 200a and network topology 200b form. E-LAN service is a multipoint-to-multipoint service that connects LANs 201-206 in different customer sites over a Carrier's backbone creating a perception of a single-bridged enterprise LAN 210. For example, customer networks 201-206 are connected at Customer Edge (CE) switches CE1-CE6 to Provider Edge (PE) switches PE1-PE3 in a PBB Network 210 by Attachment Circuits (ACs) AC1-AC6. For each customer network 201-206, the provider network 210 appears to be a single LAN to which CE devices are attached.

Groups of customer networks 201-206 may belong to separate respective E-LAN instances 230, 240 at the provider network 210. For example, customer networks 201, 202 and 205 belong to E-LAN instance 230 and customer networks 203, 204 and 206 belong to E-LAN instance 240. To maintain separation across several E-LANs 230, 240, each instance is associated with an Ethernet Virtual Switch Instance (EVSI) 235, 245. EVSI instance information is maintained and processed at associated PE switches, with ingress PEs responsible for forwarding frames based on the destination MAC address lookup.

In order to achieve any-to-any connectivity to all the remote sites, all EVSIs 235, 245 of an ELAN instance 230, 240 are connected via a full-mesh of PBB-TE Trunks (PT) PT1-PT3. EVSI is analogous to an intelligent learning Ethernet Bridge that is connected to virtual and physical ports (e.g., PT1-PT3 and AC1-AC6). For example, EVSI 235 at PE1 is connected to CE1 via AC1 and to EVSI 235 at PE2 and PE3 via PT1 and PT2, respectively. EVSI 235, 245 at each PE builds and maintains a MAC address forwarding table that maps the destination MAC address and the associated port or PT. The learning process is done by inspecting the source MAC address of a frame arriving on a port or over a PT, and by creating a corresponding entry in the forwarding table.

The forwarding mechanism and frame processing at a given PE switch involves two scenarios: frames received on a port (AC) and frames received on a virtual circuit (PT). When the service frame destined to a remote site is received on one of the ACs at an ingress PE it is processed to determine the outgoing circuit, either physical (AC) or virtual (PT) transport circuit, to reach the remote site. This is done by looking up a destination MAC address on the MAC forwarding table associated with the E-LAN service instance 230, 240 of the incoming port. If found, the frame is encapsulated appropriately and transported across the PBB network 210 to the remote PE or other AC. In the absence of a match, the frame is flooded on all the attached circuits, both physical (AC) and virtual (PT). Also, the received frame's source MAC address and incoming circuit is added, if not present, or timer refreshed for the existing table entry.

For example, if Node A sends traffic to Node B, the frame reaches PE1 from CE1 through AC1. PE1 performs a lookup in the E-LAN service instance 230 MAC address table for Node B's MAC address. If Node B's MAC address is not found, the frame is flooded over PT1 from PE1 to PE2 and over PT2 from PEB to PE3. When a service frame destined to a remote site is received on a PT, the frame processing is similar to one received on a physical port, however, the flooding is limited to only physical ACs. This limited flooding is to prevent the forwarding loop that can occur if flooded on virtual links (i.e., Split Horizon).

If a frame is received on the PT1 from PE2 to PE1 with the MAC address for Node A, PE1 performs a lookup in the E-LAN service instance 230 MAC address table for Node A's MAC. In the absence of a match, the frame is flooded over all the physical ports (ACs) and not on any of the PTs. In this case, it is flooded onto AC1 and AC4 connected to CE1. The treatment of broadcast traffic is similar to flooding in which the frames received from an attachment circuit are sent on all the attachment circuits and PTs. The remote PEs, in turn, flood received broadcast frames on all related ACs for that E-LAN instance. Similar to Unicast frame treatments, the frames received over PTs are not sent over other PTs to avoid forwarding loops (i.e., Split Horizon).

Figure 3:
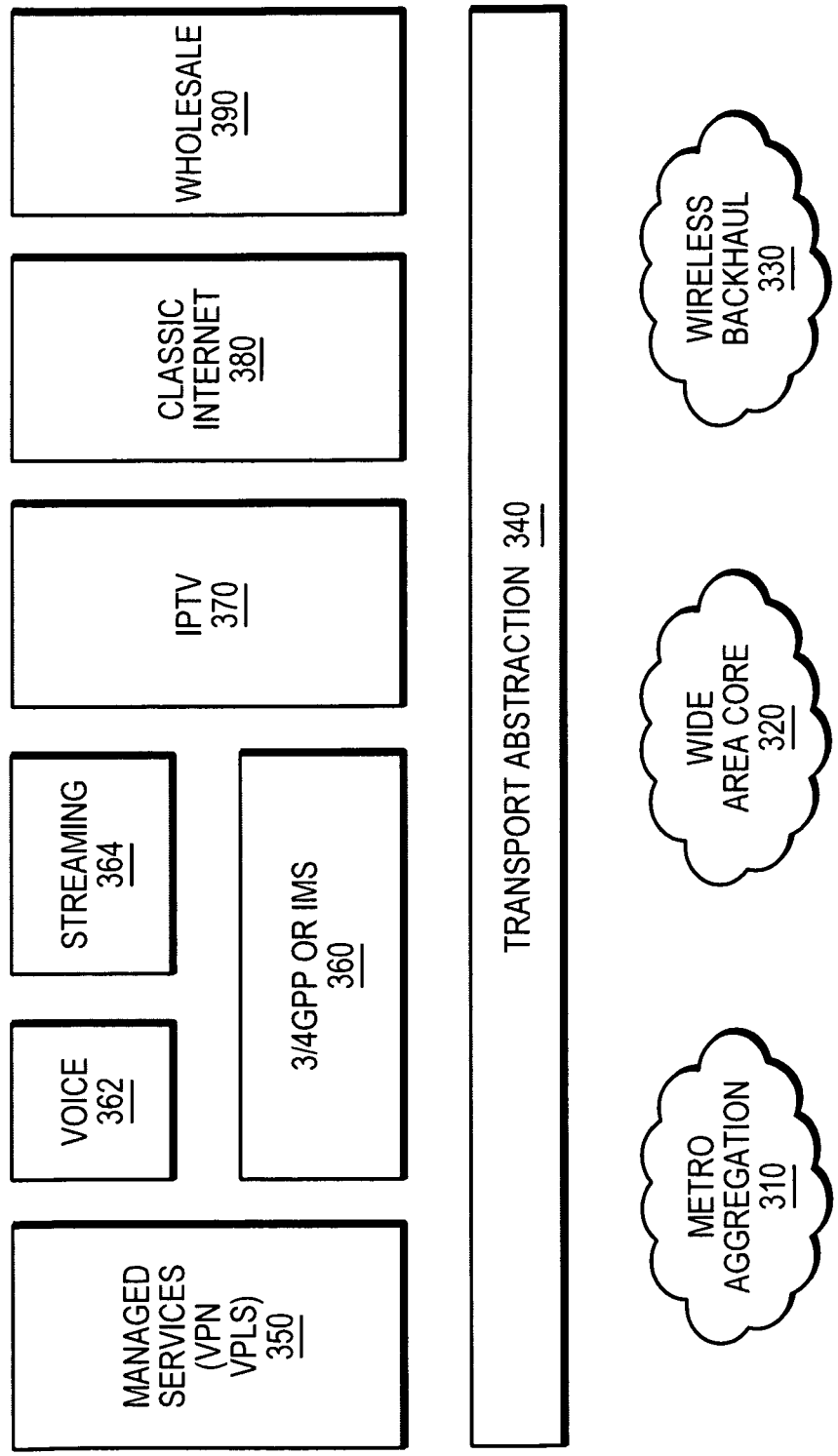
FIG. 3 is an abstract block diagram illustrating a network structure created under standards generated by the Institute of Electrical and Electronics Engineers (IEEE), the International Telecommunications Union (ITU), the Internet Engineering Task Force (IETF) and the Metro Ethernet Forum (MEF).

FIG. 3 is an abstract block diagram illustrating a network structure created under the standards generated by the IEEE, ITU, IETF, and MEF. A provider network of optical and Ethernet devices (not shown) creates a physical infrastructure in the metro 310, wide area core 320 and backhaul 330. Over this, a transport abstraction 340 hides the differences in underlying technologies and facilitates the creation of point-to-point, multipoint and one-to-many services. Some of these services are directly sold to end users (e.g., managed services 350), while others (e.g., 3rd Generation Partnership Project (3GPP), 4GPP, IMS 360) form the foundation for "service infrastructure" supporting voice 362, streaming 364, IP Television (IPTV) 370, broadband Internet 380 and other applications, such as wholesale services 390.

The fundamental task of the control plane is to implement network policies associated with services based on the current state of the network. In the early days of IP networks, the control plane was integrated on the line cards. The simple distributed control plane in IP networks allowed their rapid growth. However, as the traffic and size of the networks increased, in a first step in separating the control plane from the forwarding plane, the control plane was moved to a separate processing card but was still integrated into the router.

As the networks continued to increase in size, the complexity of the control plane increased dramatically and the fundamental assumptions that underlie the distributed autonomous control plane no longer held. To provide predictable services with guaranteed SLAs across a wide variety of traffic types in a cost-effective manner, the network was partitioned into hierarchical domains to overcome control plane processing limitations associated with the Internal Gateway Protocol (IGP). To overcome scalability limitations with the External Gateway Protocol (EGP), Route Reflectors were introduced. Although Route Reflectors were essentially routers with no user ports, they represent the second step in moving the control plane off the routers and switches. However, a more comprehensive and holistic view of the entire network (or networks) is required because of the multiple services with multiple network policies.

Figure 4A:
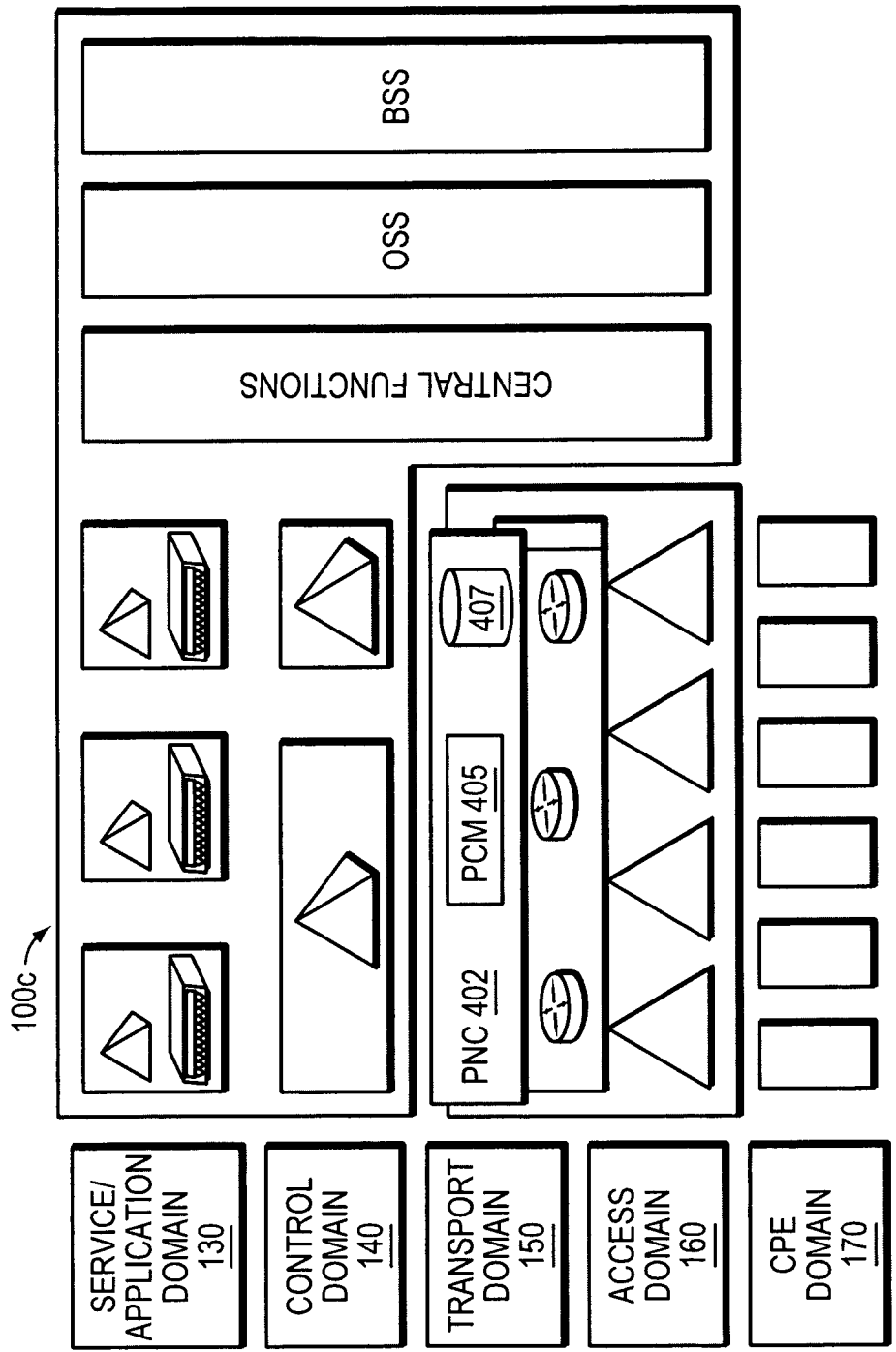
FIG. 4A is an abstract block diagram illustrating the NGN architecture of FIG. 1C including an example embodiment Provider Network Controller (PNC) according to the present invention.

FIG. 4A is an abstract block diagram illustrating the NGN architecture 100c of FIG. 1C including an example embodiment Provider Network Controller (PNC) 402 according to the present invention. The PNC 402 addresses the challenges in building services across today's evolving network infrastructure 100c, provides a comprehensive state-of-the-art multi-layer, multi-vendor dynamic control plane and implements service activation and Layer 0-2 management tools for multiple transport technologies including Carrier Ethernet, PBT, MPLS, T-MPLS, optical and integrated networking platforms. The PNC 402 is technology-agnostic and designed for networks that encompass single or multiple switch technologies, thereby serving to hide the complexity of the technology and structure of the transport domain and support the resource side via abstractions such as TeleManagement Forum (TMF) and IPsphere. The PNC 402 provides a common control framework for underlying technologies, including IP, Ethernet and optical, and enables migration between the different network technologies. As a software-based system, the control plane is fully automated.

The PNC 402 bridges the gap between the physical networks of the Transport Domain 150 and the software infrastructure of the Control Domain 140 in NGN architectures by providing Service-Oriented Architecture (SOA) interfaces to cleanly abstract transport objects that are expressly designed to support both wholesale and retail services. By providing an abstraction layer that overlies both MPLS and PBT, services can be mapped to either MPLS or PBT as desired. Further, the PNC 402 makes it possible to seamlessly migrate to PBT from MPLS without a flag day scenario (i.e., a complete restart or conversion of a sizable body of software or data). The PNC 402 sits as an API between the business 140 and network 150 layers where it translates business policy into network policy, thereby enabling this flow of information.

An example of a higher-layer application service that could be handled by the PNC 402 is IMS. At the highest level, IMS simply establishes a point-to-point user session between two gateways over any available full-mesh packet transport-capable network technology (i.e., IMS does not care about the underlying transport technology, such as MPLS, native IP and PBT). A key factor is the SLA; therefore the application is resource aware. The PNC 402 can provide an API to IMS Resource Admission Control Function session-aware elements, choose the optimal transport elements, provision the network, and monitor actual characteristics for compliance against desired behavior.

Path computation in the PNC 402 is performed by a Path Computation Module (PCM) 405. The PCM 405 is a highly-optimized multi-threaded module 405 capable of routing, for example, three thousand flows per second in a one hundred-node network in its base (singlethreaded) configuration. The primary task of the PCM 405 is to apply traffic engineering rules and network policies against the network topology to optimally route each service across the network. The PCM 405 keeps track of all the flows that have been routed in the network. It also maintains a database 407 storing data for each node and link of the flows that have been routed through that element as well as the associated capacities, utilizations, and performance metrics for that element.

Figure 4B:
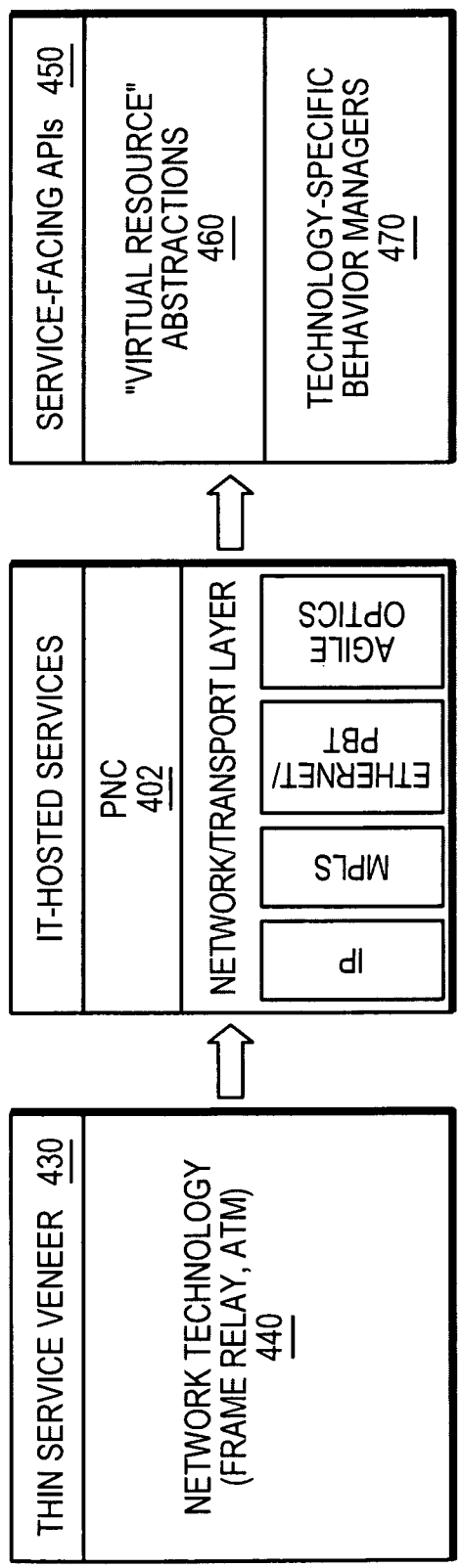
FIG. 4B is an abstract block diagram illustrating the abstraction layer provided by the PNC.

FIG. 4B is an abstract block diagram illustrating the abstraction layer provided by the PNC 402. Services 430 are defined based on network technology 440. The PNC 402 then emulates legacy service definitions and defines new services independent of the network technology 440, thereby facilitating inter-provider services and service management and feature application integration. The PNC 402 provides service-facing APIs 450 that are layered over virtual resource abstraction 460. Resource abstraction 460 describes abstract behaviors of resources in the network to enable the mapping of service requirements to available resources. Behavior managers 470 map virtual resources to network technologies in an optimal way. For example, a low resource-intensive application could be carried via IP and a more-demanding application could use MPLS. In the access network, Ethernet or PBT could be used, or for a high-bandwidth service an all-optical link could be selected where available.

Referring back to FIG. 4A, the PNC 402 overcomes fundamental technical difficulties with current distributed control plane implementations. Unlike traditional, static service provisioning, the PNC 402 continually monitors for SLA compliance as well as network faults, and optimizes network resource commitments, providing a higher level of network reliability and efficiency than has previously been possible with packet-based technology. The PNC 402 mediates between multiple resource requests from the OSS services 430/control layer via a standard SOA based interface. It dynamically models the available and occupied capacity of the network, selecting the most effective path based on modeling customer and carrier QoS and policy requirements. There are numerous advantages provided by the PNC, including: (1) elimination of hardware limitations; (2) elimination of vendor limitations on innovation; (3) enhancement of control plane robustness; and (4) end-customer customization and programmability services.

Advanced switching and routing products require customized hardware development to achieve state of the art price/performance. This necessitates long development cycles. The choice of a processing engine for the control plane for a product occurs early in the development cycle because it must be integrated with the platform hardware and software. As a result, the control plane processor typically is already obsolete when the product is introduced compared to general purpose computing platforms, which closely track Moore's Law, constantly improving their price/performance. Simple tasks such as adding more memory to an integrated control plane processor frequently require a hardware upgrade and, in many cases, require a complete forklift upgrade of the entire system. This has created a model in the industry where the customer pays for new features by buying new hardware.

The PNC 402, as a separate control plane based on software running on general purpose computing platforms, eliminates these limitations. The control plane resources can track Moore's Law improvements in computing capabilities without being limited by hardware design points in the forwarding plane. Scaling is accomplished by adding additional processing and memory resources, not by upgrading the forwarding plane hardware. Features are purchased as features, not as new hardware. And, fine grained policy controls can be implemented without running into resource limitations introduced by the integrated control plane processor.

Innovation in the industry has been stifled by the "Least Common Denominator" effect where the customer cannot deploy new features until all the vendors in the network have implemented an interoperable solution, which typically requires a hardware upgrade or replacement. The only alternative has been a "winner takes all" approach where the customer is forced to purchase all the equipment from a single vendor to get the desired feature while at the same time giving up other desired features not implemented by that vendor. With a separate control plane in the PNC 402, many features can be implemented in the control plane software itself and put into service independent of the forwarding plane hardware. Moreover, the PNC 402 mediates differences in implementation between vendors enabling a seamless service that otherwise would not be possible. Because it is a software-based implementation, it is not tied to long forwarding plane hardware development cycles, thereby greatly increasing feature velocity and the ability to grow new revenues through new services and features.

The PNC 402 protects the control plane from forwarding plane-based anomalies and attacks. It provides the ability to easily hide the internal network infrastructure which becomes increasingly important in inter-provider services. It also prevents forwarding plane congestion from affecting control plane actions to correct the problem, which is a common source of major network outages. The PNC 402 also allows more redundancy and resiliency options for the control plane, as the control plane redundancy/resiliency options can be configured separate from the forwarding plane configurations, thereby allowing high levels of availability at substantially lower cost. For example, the control plane could be configured for 1:1, 1:N, M:N, mated pairs, etc., independent of the forwarding plane configurations.

Aside from the general benefits of having a separate control plane in the PNC 402, there are three significant technical differences between distributed and centralized path computation as in the PNC 402: (1) predictability; (2) failure handling; and (3) optimality and constraints.

First, in large networks, with a distributed algorithm it becomes increasingly difficult to accurately predict the path that a flow takes through the network, particularly during times of network stress (e.g., a multiple facility failure). In a centralized path computation environment, restoration paths are preplanned and can be simulated and modeled in advance. This becomes particularly important for mission critical services with strict SLAs. Centralized provisioning gives carriers two major advantages: (1) exact knowledge of the path each customer's traffic takes; and (2) precise and efficient allocation of network resources. Building on this technology, carriers can meet several important goals, such as (1) offering and delivering precise SLAs; (2) achieving higher availability while lowering operating costs; and (3) profitably expanding their target markets to include small businesses. These goals are made attainable by two capabilities unique to Carrier Ethernet in the packetswitching world: (1) carrier-class OAM&P (including 50-millisecond (ms) failover); and (2) finely tuned, automated traffic engineering enabled by an external control plane.

Further, in a distributed algorithm, such as Open Shortest Path First (OSPF), a failure in the network is handled "locally" (i.e., the nodes compute a new path around the specific failure using the existing path computation algorithm). In a centralized implementation, as in the PNC 402, the control plane computes a primary path and a redundant backup path to be used in the event of failure of any element in the primary path. The backup path must be completely redundant because it is not possible to know in advance which element failed. The fully-redundant path may not be the optimal path for any specific failure. At the same time, the locally-computed distributed failure path may not be optimal for the network as a whole (e.g., if it moves a substantial amount of traffic to an already congested link). Recovery in a centralized implementation is instantaneous; whereas, in a distributed implementation, recovery time depends on the convergence times and stability of the various protocols.

Distributed algorithms such as OSPF rely on an optimality property used by dynamic programming algorithms for its efficiency and operation. The optimality property stems from the ability to break the original problem down into sub-problems and the optimal solutions to the sub-problems lead to the optimal solution to the original problem. However, with the addition of constraints (e.g., bandwidth, delay, jitter, etc.) to the problem, the situation changes and the optimality principle that leads to efficient distributed algorithms no longer holds. In general, constrained shortest path problems are Non-deterministic Polynomial time (NP) complete, although in practice it is possible to get near polynomial performance from real algorithms in practical network applications. Consequently, for constrained path computations such as those expected in emerging applications, existing distributed algorithms don't work without adding significant complexity and global network knowledge, in which a more centralized approach is then preferred.

Doing an entire network optimization (i.e., simultaneously routing all the flows in the network) is likely to be costly, due to the complexity of constrained routing, and of little value because carriers are not likely to want to destabilize their networks this way. The PCM 405 performs local optimization by periodically identifying "mis-routed" flows. A mis-routed flow is a flow with a current path that significantly differs in "cost" from its unconstrained least cost path. The PCM 405 attempts to find other flows that could be pre-empted (i.e., rerouted) with the least incremental cost that would bring the mis-routed path within bounds. The "mis-routed" path function can also be used to decide which paths should be moved to a new piece of equipment added to the network. Moving only the "mis-routed" paths minimizes the amount of churn introduced into the network. The optimal paths for all flows are computed and flows that would use the new equipment are identified and the mis-routed flows within that set are rerouted to use the new equipment. This likely frees capacity in other parts of the network, allowing other mis-routed flows to be rerouted. The process continues in this manner until no new mis-routed flows can be rerouted.

The PNC's database 407 of the status of each network element, including the relevant utilization and performance statistics, allows the PNC 402 to, over time, forward-project utilizations for network planning purposes. In addition, the PNC 402 knows which elements and paths are approaching constraints and contributing to mis-routed paths as an additional component of the network planning process. In addition, tracking the percentage and number of "mis-routed" paths over time gives additional insight into network planning issues. The PNC 402 also supports a "what if" mode allowing the network planner to see the effects of adding, changing, or subtracting network capacity. They can also model the effects of network failures as well as "pre-planning" maintenance events.

The PNC 402 allows the introduction of PBB-TE into real world carrier networks by allowing carriers to take advantage of new Carrier Ethernet technology to support all of their business applications, ranging from E-Line and E-LAN services. With PBB-TE, Service Providers can traffic engineer their networks by specifying the tunnel paths for individual service instances. Further, the PNC 402, using PBB-TE, allows a Provider to introduce new Carrier Ethernet equipment into networks 400 without the interoperability burden that exists within integrated data/control plane solutions as in the prior art. Carriers can achieve service-specific QoS and bandwidth reservation to guarantee SLA compliance for the transport network. The use of Ethernet technology allows backup protection tunnels to be configured and leverages Carrier Ethernet OA&M standards to provide <50 ms failover times, matching the benchmarks set by existing SONET/SDH networks.

PBB-TE E-LAN services provide several benefits. First, traffic hand-off is at Layer 2, with traffic ingress and egress from both access and provider domains being through Ethernet switches. Hence, existing Ethernet deployments offer services with stringent SLAs without network rebuilds. Second, it provides a connection-oriented circuit scheme over a shared infrastructure at a much lower cost point as compared to traditional routers used to construct VPN services. Further, the PNC 402 eliminates the need for additional protocol complexity and user configuration errors. Moreover, the absence of discovery and signaling protocols eliminates possible scaling limits enforced by the protocol controls. Finally, the centralized scheme allows for more robust security that can be applied at a single configuration point. The PNC 402 is flexible enough to integrate with any external server to retrieve E-LAN membership information.

There is a real value in having an independent Level 2 infrastructure that can create "routes" that are associated with major traffic patterns and can be managed on how the physical infrastructure is used. The separation of the control plane from the data plane decouples service provisioning from the underlying network technology, allowing carriers to deploy heterogeneous networks and to evolve their network and service offerings independently. However, merely computing paths is not enough. Effective and efficient provisioning of services and resources is required.

The purpose of a service management framework is to build the link between the service experiences being offered by the service provider and the resources that sustain those experiences. In the early days of data networking (when data services were sold to enterprises for tens of thousands of dollars per month) the service-to-resource linkage was created through manual provisioning. A major cause of service outages in today's networks is operator error. Although carriers still occasionally have to resort to manual provisioning, even given the complexity of today's routing and switching elements, as a general practice, manual processes have fallen out of favor because the declining average revenue per user (ARPU) of broadband and data services.

Instead, operators employ forms of process automation to create and maintain service-to-network linkages. For this to be effective, the connection and performance goals of the service must be translated automatically into resource commitments. This means converting the abstract vision of a service as a set of behaviors into the provisioned version set of resource commitments. Element/device management systems, network management systems and policy management systems are all useful for the provisioning portion of this process, but less so for the conversion from abstraction to provisioning. However, with a separate control plane such as the PNC, such services can be safely and securely implemented without putting the network at risk. For the carrier, allowing customer programmability and customization provides a source of new revenue and service differentiation while simultaneously reducing their operational cost.

Some of the building blocks used for the construction of the solution are similar to Virtual Private LAN Service (VPLS) currently deployed in MPLS networks. The key differences are: (1) the use of PBB-TE trunks and Service instances (I-SID) instead of LSP tunnels and Pseudo wires, respectively; (2) the use of an external controller in the PNC in place of discovery and signaling mechanisms (Border Gateway Protocol (BGP), Label Distribution Protocol (LDP), etc.); and (3) the concept of EVSI at PE switches in place of Virtual Switch Instance present on PE routers. Hence, the three building blocks of an E-LAN service over PBB-TE are: (1) external network controller in the PNC; (2) full mesh PBB-TE Trunks at the core; and (3) EVSI per E-LAN instance.

Figure 5:
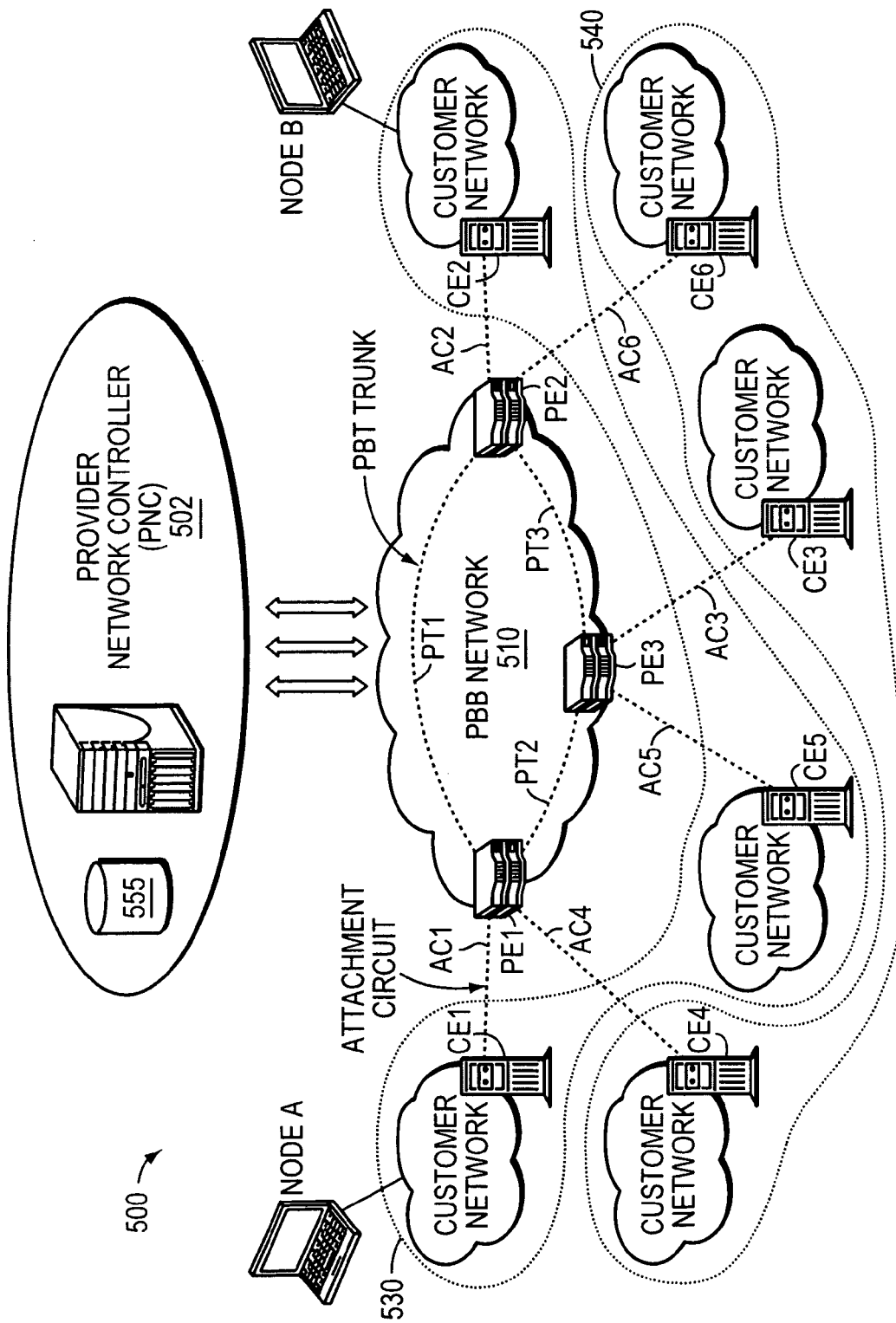
FIG. 5 is a network diagram illustrating an example E-LAN service deployment employing an example embodiment PNC according to the present invention.

FIG. 5 is a network diagram illustrating an example E-LAN service deployment 500 employing an example embodiment PNC 502 according to the present invention. The PNC 502 facilitates discovery and signaling along with QoS and policy based path provisioning for the PBB-TE trunks. Discovery involves PEs discovering other PEs members of a particular E-LAN instance 530, 540. The signaling aspect addresses the provisioning full mesh PBB-TE trunks between PEs. Membership to a particular E-LAN service instance 530, 540 is expressed at the PNC 502 by associating the attachment circuit AC to a particular E-LAN instance 530, 540. The PNC 502 maintains a repository 555 of mappings of E-LAN instances 530, 540 to PE switches, along with ports (ACs) associated in its highly available data store. Additionally, the PNC 502 provisions the mapping between E-LAN service instances 530, 540 and ACs for all the PE nodes in the PBB network 510. Based on mappings expressed, the PNC 502 computes paths satisfying service required QoS and user policy constraints to provision PBB-TE trunks between PEs.

Figure 6:
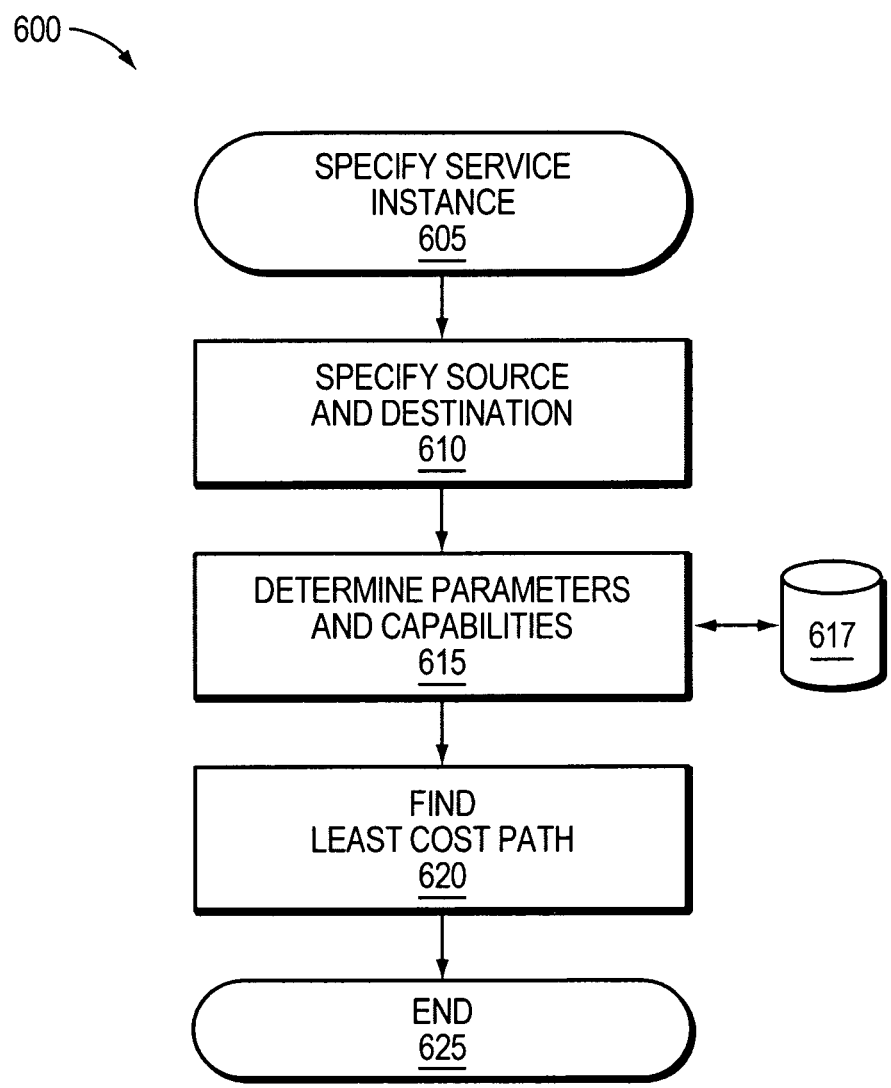
FIG. 6 is a flow chart illustrating path computation by an example Path Computation Module (PCM) in an example embodiment PNC according to the present invention.

FIG. 6 is a flow chart 600 illustrating path computation by an example PCM in an example embodiment PNC according to the present invention. The PCM uses a variation of the Dijkstra shortest path algorithm to perform algorithmic computations. This is efficient not only in a theoretical sense, by only extending the best known path at a time, but also from a practical sense because it limits the nodes under consideration to the subset that move most efficiently towards the destination. Path computation begins by specifying a service instance 605 and specifying a source and destination location 610. For each type of service, the PCM determines 615 the constraints and parameters required for the service and the capabilities and status of each piece of equipment in the network as stored in a database 617. The PCM then proceeds to find the "least cost" path in the network that satisfies the constraints associated with the service instance 620. The process then ends 625.

The cost function that is minimized by the PCM can be a function of many variables depending on the situation. In a simple case, the cost function could simply be the hop count or in delay-sensitive applications the cost function could be the latency or physical length of the link. In more complex cases, the PCM is capable of supporting various heuristics in its computations. For example, various functions of the link utilization can serve as heuristics for performance metrics, such as delay, jitter, packet loss, flow balance, and can be incorporated into the cost or constraint functions. Heuristics may be applied to stimulate certain network behaviors (e.g., giving preference to higher speed links by using a lower cost function as a function of link speed). Similarly, other network behaviors can be achieved by using a cost function that is a weighted sum of various factors (e.g., latency, packet loss, hop count, jitter, flow balance, link utilization, etc.).

The PCM also supports heuristics for tie-breaking procedures and for evaluating less than optimal alternatives to the optimal path and for determining redundant path selections. For example, the PCM also computes a fully redundant path (i.e., no nodes or links in common with the primary path) except the given endpoints using the Bhandari algorithm. If no fully-redundant path exists, the PCM suggests alternatives, highlighting the common elements with the primary path. The PCM uses tie-breaking rules to select a path when multiple paths with equal cost result. Tie-breaking rules may be configured by the user. The default tie-breaking rule may minimize the link utilization across the path since link utilization is a primary determinant of delay, jitter, and load balance. Optionally, the PCM can be configured to additionally compute less than optimal paths that might have better performance in other metrics (e.g., flow balance).

In addition, the user may wish to override the cost function for certain links and insert a particular value to achieve certain behaviors. The user can specify an overbooking factor to be used in path computations. The overbooking factor is the ratio of the amount of traffic routed over a network link to the nominal capacity of the link. For "guaranteed bandwidth" computations, the overbooking factor is 1.0. Using an overbooking factor greater than 1.0 (e.g., 2 or 3) takes into account the statistical and time-varying nature of the traffic flows, providing better overall network utilization. The overbooking factor can be specified network wide, per link, or per type of link (e.g., core vs. access).

NGNs require an integrated approach to interfacing the business systems driving the services to the network elements providing the services as opposed to the smoke-stack implementations of today's networks. The PNC provides a clean abstraction of the network elements to the NGN software frameworks across different technologies, different vendors and different networks. In general, flows are routed sequentially in the network (i.e., routed in the order in which the service was ordered). In an unconstrained network, this is also the optimal routing because each flow has available to it the entire network and chooses its best path. In a constrained routing network, the order in which the flows are added can make a substantial difference and lead to an overall less than optimum routing plan.

One of the unique capabilities of the PNC is its ability to apply complex network policies to the path computation process. Network policies of various types are supported. Rules defining a constraint about the service instance being routed may tell the PCM what types of network equipment are allowed and/or required or, in some cases, disallowed. An example would be Lawful Intercept, where a path might be required to traverse a Lawful Intercept Point somewhere in the network.

Another example might be politically-sensitive traffic where the path is required not to traverse certain geographies and hence certain network equipment. This scenario is handled by removing those nodes and links from the topography of the network and running the path computation algorithms. The network equipment database allows the PCM to match the network elements under consideration with these rules. The rules respond dynamically to the routing process, for example, matching encapsulation methods along the route of the path. Also, rules can be used to enforce desired network behavior that would be undesirable in many real networks (e.g., preventing a circuit from routing from an access node to a core node to another set of access nodes back to the core and from there to the desired destination access node).

The Lawful Intercept case is more detailed. The optimal algorithm is to compute the shortest paths from the source to all the Lawful Intercept Points in the network, compute the shortest paths from each Lawful Intercept Point to the destination, and then choose the path through the Lawful Intercept Point where the sum of the costs of the two sub-paths is the lowest. Although optimal, this algorithm is not necessarily efficient because it finds the routes to/from all the intercept points in the network even though many of them are unlikely to participate in the solution. The ability to deal with requirements such as Lawful Intercept can be extended to multiple types of such requirements in arbitrary order using a more efficient approach, such as the multi-layer path computation capability of the PCM.

Figure 7:
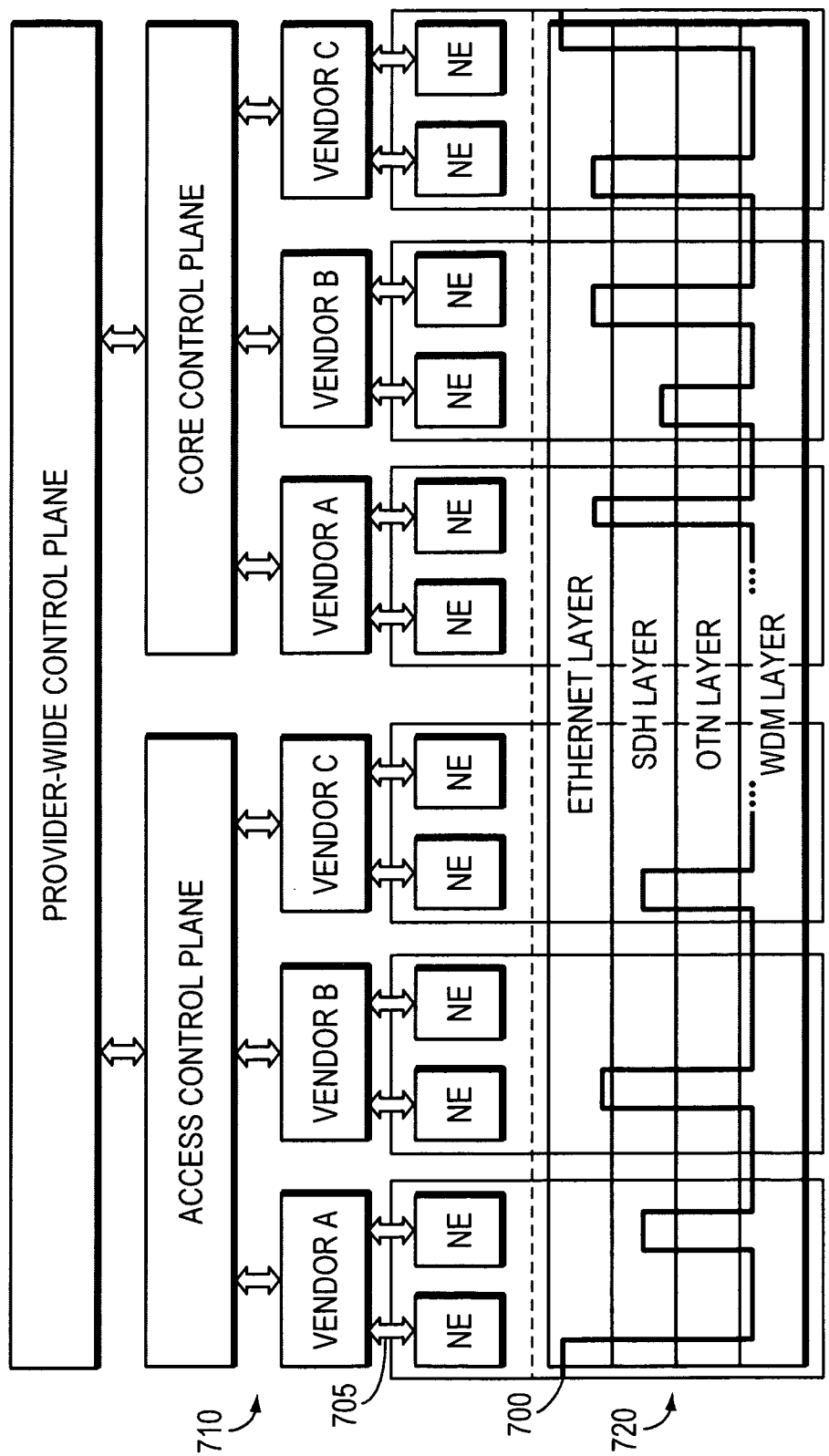
FIG. 7 is a state diagram illustrating the layer state of the path as a flow is routed through the network to maintain consistency with network policy.

FIG. 7 is a state diagram illustrating the layer state 700 of the path as a flow is routed through the network 710 to maintain consistency with network policy. In multi-layer path computation, the network topology consists of several layers 720 (e.g., Wavelength Division Multiplexing (WDM), Optical Transport Network (OTN), SDH and Ethernet) and the nodes (NEs) and links 705 in the network 710 may appear in several layers 720. This situation arises when performing integrated Layer 0-2 path computation, as well as when dealing with constraints within the network, such as different adaptations or multiplexing schemes at the physical layer, different encapsulations at the logical layer, and when enforcing network policy rules, such as those regarding physical diversity of the underlying transport facilities. Such constraints may arise when carriers buy physical equipment (e.g., network equipment (NE)) from different vendors (e.g., Vendors A, B and C). Those vendors may supply a vendor-specific piece of software to help manage the network. Those subsystems need to be integrated into larger units in order to provide end-to-end services. Moreover, as the path traverses each layer, the PNC must appropriately auto-adjust the failover time constants to account for the restoration protocols of each layer.

In addition to basic path computation in multi-layer networks, the PCM uses a proprietary algorithm to compute edge and node disjoint redundant paths in a multi-layer network 710. Multi-layer path computation also allows direct expression of shared facility constraints in the underlying transport networks. This capability can be enabled for all or part of the network, enabling the service provider to provide this level of protection to the most critical portions of the network without having to worry about all of the underlying transport plant.

An example of multiple constraints of this type can occur in tail circuit routing. In most cases, the requested path is not to a specific node but rather to any node having a particular capability (e.g., Broadband Remote Access Server (BRAS), Session Border Controller (SBC), Multi-Service Access Node, Service Provider Interface Point, etc.). In some cases, the path may terminate at that point if the remainder of the path from that node is already established. In tail circuit routing, the PCM determines the path using a multi-layer path computation algorithm as described above. In more complex cases, there may be multiple types of nodes that must be traversed, requiring a more complex but similar multi-layer routing approach. In a tail circuit routing problem (e.g., routing to a BRAS), the PCM can develop redundant paths to the BRAS or alternatively a redundant path to another BRAS if the network policy so dictates. In the former case, the dynamic control plane of the PNC would detect the failure of the BRAS or the trunk behind the BRAS and reroute all the paths terminating on that BRAS.

Figure 8:
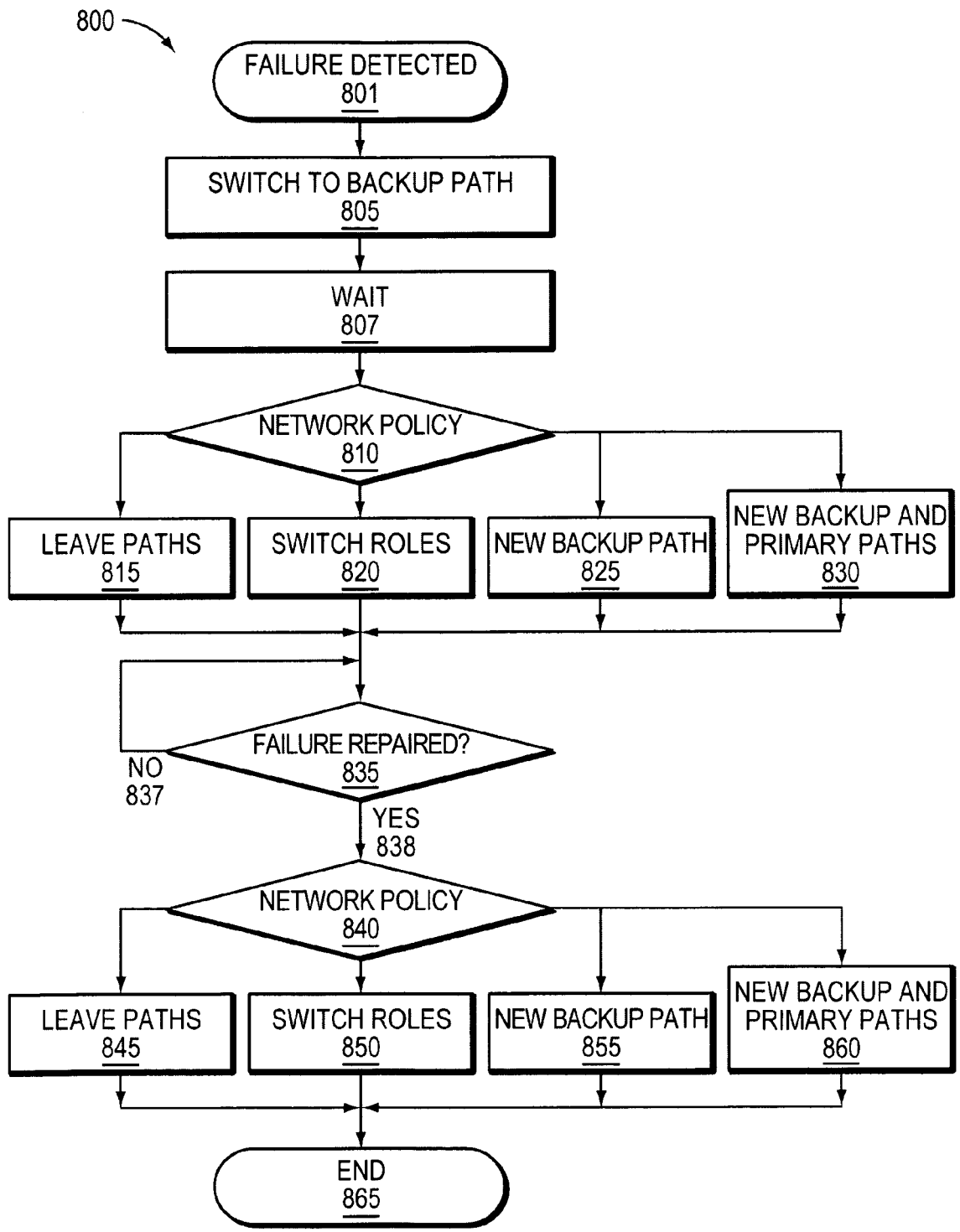
FIG. 8 is a flow chart illustrating a class of network policies that occurs with respect to network failures and recoveries in an example embodiment PNC according to the present invention.

FIG. 8 is a flow chart 800 illustrating a class of network policies that occurs with respect to network failures and recoveries in an example embodiment PNC according to the present invention. When a failure is detected 801, the network equipment switches to the backup redundant path 805. Because some failures are automatically recovered by the underlying transport network, the PNC generally waits 807 a period of time before taking any action. Further action depends on the network policy 810. After that time has expired, the PNC can leave the paths as is 815. Or it can switch the roles of the primary and backup paths 820. Alternatively, the PNC can compute a new backup path 825 or new primary and backup paths 830 based on the new network topology reflecting the failure. The PNC then determines whether the failure has been repaired 835. If not, the PNC continues to monitor the network 837. Once the failure has been repaired 838, a set of options 840 similar to those above, such as leaving things as is 845, switching the roles of the path 850, computing a new backup path 855 or new primary and backup paths 860. The policy choices here become particularly important when dealing with constrained path computation because new services routed between the time of failure and the time of repair could consume resources used by the original path set. The process then ends 865.

Figure 9:
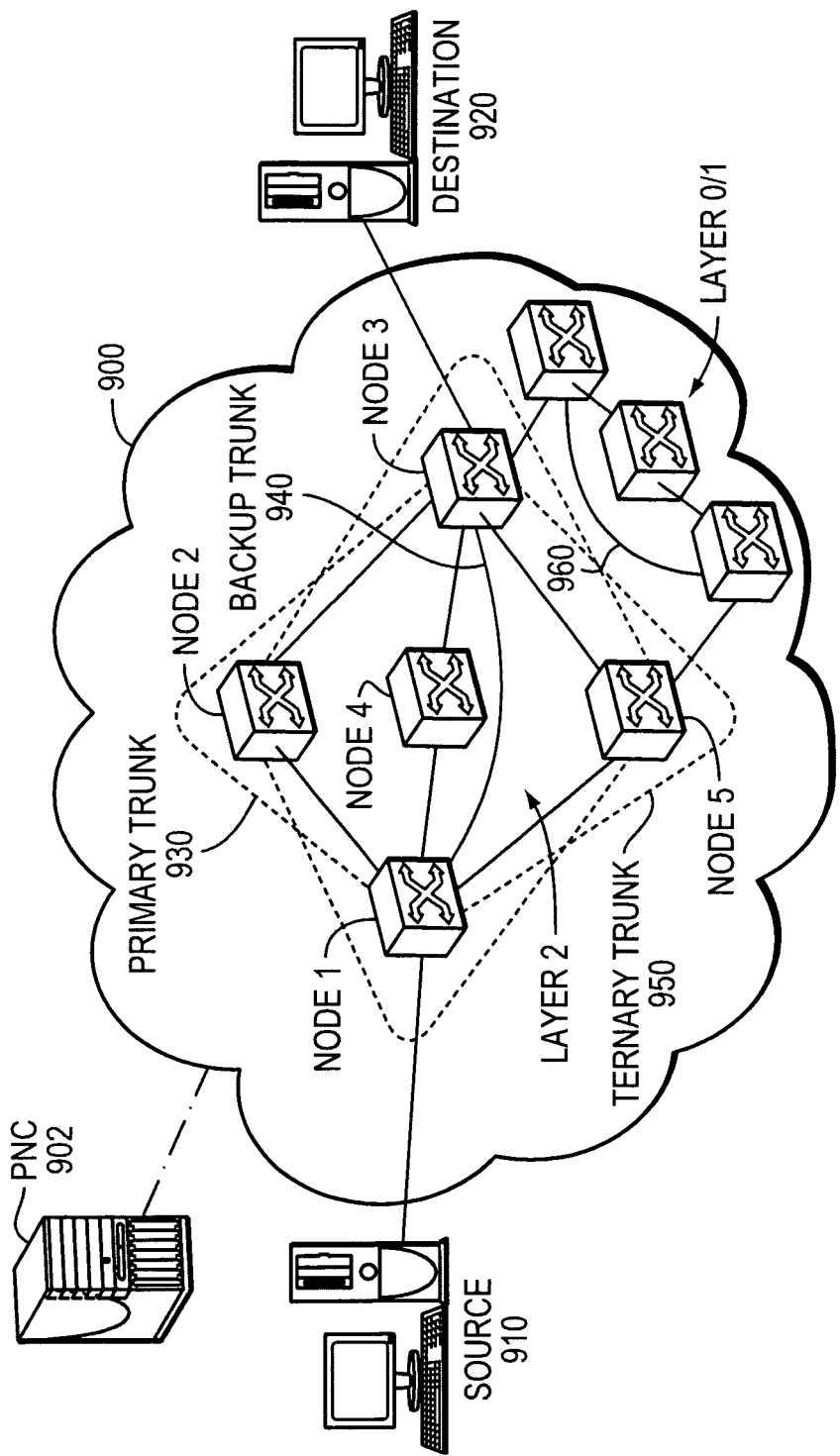
FIG. 9 is a network diagram illustrating a network including an example embodiment PNC according to the present invention that assists network maintenance operations and events, and the associated state of network links.

FIG. 9 is a network diagram illustrating a network 900 including an example embodiment PNC 902 according to the present invention that assists network maintenance operations and events, and the associated state of network links. "Bridge and roll" is a good example of an operation that can easily be performed by the PNC 902, which makes it possible for customers to introduce new hardware or services seamlessly into an existing network or perform routine maintenance in an automated fashion. In this example of network policy, the PNC 902, which maintains mapping between services, transports (trunks, LSPs), nodes and links, enables customers to request the removal of nodes from active service without disruption to services by safely moving all the traffic off a particular piece of network equipment during maintenance events.

In the network 900, a bidirectional primary trunk 930 through Node 1, Node 2 and Node 3 carries data between a source 910 and a destination 920. There also exists a backup trunk 940 between the source 910 and destination 920 through Node 1, Node 4 and Node 3. Keep-alive messages are sent on both the primary and backup trunks (e.g., at a rate of 10 ms). If the source 910 fails to receive a response within the specified failover window (e.g., 30 ms) from a node (e.g., Node 2), the source 910 fails over to the backup trunk 940. The node (e.g., Node 2) is then taken out of service by the PNC 902 which then notifies all the affected services. For each service that is impacted, the PNC 902 re-computes new trunks and maps the service through the available network. For example, the source must then compose a new backup, or ternary, trunk 950. In this case, the ternary trunk 950 goes through Node 1, Node 5 and Node 3. When the customer is ready to declare a switch active again, the node can be enabled. The PNC 902 detects the new switch in the network and re-computes all the existing tunnels. Similar to the discussion above, the network policy then determines how the flows are handled when the piece of network equipment is returned to service.

The PNC 902 may be used for service migration by emulating communication tunnels in a network. The ternary trunk 950 actually may be composed of network links other than Layer 2 by the PNC 902 emulating connectivity using different technologies. For example, the ternary trunk 950 may be composed over a Layer 0/1 ring network 960. However, in composing the ternary trunk 950, the PNC 902 makes this change in layer seamless so that it appears to the service as a Layer 2 link. Moreover, the ternary trunk 950 has a restoration time greater than that of the underlying network it uses to avoid conflicting protection mechanisms.

The PNC 902 also may have to perform Multilayer Latency Constraint Solving. For example, when changing channels on an IPTV service, low latency is required so that there is only a short time between a command from a remote and the channel being changed. In this example, the source 910 and destination 920 believe a Layer 2 Ethernet service is connecting them. However, in reality, a optical ring network is used in the ternary trunk 950. Thus, the use of multiple network layers solves the service constraint by providing service (Layer 0/1) better than what is expected (Layer 2).

The PNC 902 also allows restoration of connections in the event of a failure. An example embodiment PNC 902 according to the present invention detects the failure and allocates a new connection based on the information stored about the connection that experience the failure. This information may relate to a level of importance associated with the service (e.g., economic or social importance). For example, emergency services, although represented by traffic like all other services, are very important and, thus, would be assigned a restoration urgency value when the service is requested. However, restoration urgency values cannot be assigned only according a priori assumptions based on the technology (i.e., voice, video, Short Message Service (SMS)) because that type of data may carry important information, such as an emergency alert SMS message. There must be circumstantial-based prioritization (e.g., based on destination/source address). The software control plane then emulates a connection of the tunnels by directly configuring the network equipment at the interfaces of the newly formed tunnels.

The network abstraction provided by the PNC enables equipment and addressing virtualization extending the range of potential valuable new services in much the same ways that the Network Control Points extended the range of services in the voice telephony network. Network addresses no longer need to have any physical or geographic significance, and the mapping from virtual to physical address can be a function of time, location, load, etc. From an operational perspective, this network abstraction takes a complex, equipment specific procedure (e.g., a "bridge and roll" operation) and enables the entire operation to be safely and predictably performed with a single command.

The PNC may construct transports with various protection options (link and node disjoints, Shared Risk Link Groups (SRLG), etc.) to protect against primary fail events. The PNC's monitoring enables intelligent fault reporting and remediation wherein services on the network are dynamically migrated in the event of a failure. Further, the PNC enables service "repairs" in case of correlated failures that impact both primary and backup paths. This capability eliminates the need for operator intervention and reduces mean-time to repair (MTTR) for the service. Normal primary and backup paths are restored when the fault has been repaired. Moreover, as the process of transport and service creation is automated, the provisioning of new services is greatly simplified and allows network equipment to be taken on/off line. This limits manual configuration, thus reducing configuration errors which are one of the primary sources of service disruption.

However, for business customers, the E-LAN service needs to offer more than just connectivity between sites. QoS attributes, such as service attributes, defined for user traffic (frames, packets, etc.) form the basis for SLA specification. As per the MEF service framework described in Technical Specification MEF 10.1 Ethernet Services Attributes Phase 2, Ethernet services objective can be expressed using service performance (e.g., frame latency, delay variation (jitter) and loss ratio) and bandwidth profile.

Table 1a describes the various factors affecting service performance. Frame latency (frame delay) refers to the time taken by the service frames to transit across the network. It is measured from the arrival of the first bit at the ingress User Network Interface (UNI) to the output of the last bit at the egress UNI. Certain SLAs measure round-trip delay as well. Frame delay variation (jitter) depicts the difference in the time gap between two subsequent frames at the ingress UNI in comparison to the delay measured between the arrivals of the similar frames at the egress UNI. This delay is an important factor in the transmission of unbuffered video where variations occurring in the millisecond range can affect service quality. Frame loss ratio measures the number of lost service frames inside the provider network. Frame loss is measured as a ratio of the number of frames lost measured at the transport Egress divided by the number of frames sent as measured at the transport ingress.

TABLE 1a

| Factor | Description |
|---|---|
| Frame latency (Frame delay) | Time taken by the service frames to transit the network Measured from arrival of the first bit at ingress UNI to output of last bit at egress UNI |

TABLE 1a-continued

| Factor | Description |
| --- | --- |
| Frame delay variation (Jitter) | Difference in time gap between two subsequent frames at ingress UNI compared to delay between arrival of similar frames at egress UNI |
| Frame loss ratio | Number of lost service frames inside network. Ratio of number of frames lost measured at egress and number of frames sent at ingress |

Table 1b describes the building blocks for end-to-end QoS delivery. Ethernet based transport aggregating services that were traditionally delivered using separate networks require consideration of per-service QoS needs so as not to force providers to over-build their network. The key building blocks for this efficient end-to-end QoS guarantee are: (1) connection-oriented transport; (2) constraint based path computation; (3) capacity planning through effective admission control; and (4) per-hop traffic treatment in the provider network.

Connection-Oriented Transport, provided by Carrier Ethernet switches and service aggregate edge devices, refers to pre-provisioned transport across provider networks that enables PBB-TE to transmit service traffic through carriers' network. The predictability also helps in delivering QoS guarantees that meet service SLAs at optimal cost points. Constraint Based Path Computation, provided by the PNC, refers to the process of arriving at the right combination of network nodes and links, that together form the circuit-like transport which meets bandwidth, quality and carriers' policy constraints. Connection Admission Control, provided by the PNC, refers to the process of efficiently rationing available bandwidth resources across service traffic, which is grouped into classes, in compliance with agreed service contract. Per-Hop Traffic Treatment, provided by Carrier Ethernet switches and service aggregate devices, refers to service traffic transiting statistically multiplexed networks require "conditioning" at various parts of the network so that service traffic is appropriately differentiated as per agreed service contract.

TABLE 1b

| Building Block | Provided By | Comments |
| --- | --- | --- |
| Connection-Oriented Transport | Carrier Ethernet switches, Service aggregate edge devices | PBB-TE implemented |
| Constraint Based Path Computation | PNC | PNC computes and provisions QoS and policy constrained path |
| Connection Admission Control | PNC | Considering bandwidth usage on network links across all services |
| Per-Hop Traffic Treatment | Carrier Ethernet switches, Service aggregate edge devices | PNC creates multi-vendor switch models and provisions device-specific per-hop treatment |

Table 2 illustrates various bandwidth profiles (i.e., the rate at which user traffic (frames, packets, etc.) can traverse the UNI (at the admission points)). The bandwidth profile forms the basis for service offering and pricing. Bandwidth profile is expressed in terms of Committed Information Rate (CIR) and Excess Information Rate (EIR). CIR is the average rate at which a subscriber is allowed to transfer service frames. Such transfer is subject to Committed Burst Size (CBS), which is the size up to which service frames may be sent and still be CIR-conformant. EIR is the average rate, granter than or equal to CIR, up to which service frames are admitted into the provider's network. Likewise, EIR is subject to Excess Burst Rate (EBR), which is the size up to which frames as EIR-conformant.

User traffic is classified and marked (colored) at the ingress to conform to CIR and EIR. Traffic that is CIR conformant is colored green and admitted. Traffic that is CIR non-conformant but EIR conformant is colored yellow and admitted, but marked for best effort delivery; thus it could be dropped at congestion points in the network. Traffic that is neither CIR nor EIR conformant is colored red and dropped at the edges.

TABLE 2

| Bandwidth Profile | Description | Classification | Treatment |
| --- | --- | --- | --- |
| Committed Information Rate (CIR) | Φ rate at which a subscriber is allowed to transfer service frames. | Traffic < CIR - Green | Traffic admitted |
| Committed Burst Size (CBS) | ≦ size service frames may be sent as CIR-conformant. | | |
| Excess Information Rate (EIR) | Φ rate, ≧ CIR, up to which service frames are admitted into the provider's network. | CIR < Traffic < EIR - Yellow | Traffic admitted, but market for best effort delivery |
| Excess Burst Rate (EBR) | ≦ size service frames may be sent as EIR-conformant. | | |
| Rate excess of CIR and EIR | Non-conformant traffic | Traffic - Red | Traffic dropped at edges |

Table 3a illustrates an example SLA from a major provider that allows customers to get Layer 2, point-to-multipoint Ethernet connectivity to six sites at a cost of $48,000 per month. Per the SLA, bandwidth from 1 Mbps to 8 Mbps can be purchased in 1-Mbps increments, with bandwidth above 8 Mbps purchased in 5-Mbps units. The service also supports unicast, multicast and broadcast packet, with multicast and broadcast packets allowed only up to 15 percent of the total bandwidth.

TABLE 3a

| Metric | Measurement |
| --- | --- |
| Availability | On-net Ethernet access: 100% |
| | Off-net Ethernet access: 99.9% |
| Mean time to recovery (MTTR) | On-net Ethernet access: 2 hours |
| | Off-net Ethernet access: 4 hours |
| Round-trip delay (between switch sites) | 100 ms (for RT data) |
| Data delivery ratio | Real Time Data (RT): 99.995% |
| | Business Data (BD): 99.99% |
| | Basic data (BSD): 99.5% |
| Frame jitter | 5 ms (for RT data) |

The PNC decomposes the SLA into Service and Transport constructs illustrated in Table 3b. Service construct recognizes the type of service and to create a full-mesh of transports across PE switches it triggers the creation of PBB-TE trunks. The PNC builds PBB-TE trunks across PEs with QoS constraints, such as Frame delay=100 ms, jitter=5 ms, and Frame loss less than 0.05%. Network controllers built with Ethernet soft-switch models can effectively use shaping and policing abilities of the switches to "smooth" traffic flows affecting arrival distribution thus avoiding queue contention and congestion hot spot in the networks.

TABLE 3b

| Service | Details | Comments |
|---|---|---|
| Real Time Data (RT) | Premium QoS Ideal for VoIP | Sensitive to Delay, Frame loss and Frame delay variation Frame delay = 100 ms Frame jitter = 5 ms Frame loss = 0.005% |
| Priority Data (PD) | Mission critical data and video applications | Sensitive to Delay, Frame loss and Frame variation Frame delay = 100 ms Frame jitter = 5 ms Frame loss = 0.01% |
| Business Data (BD) | Transactional data and query-based applications | Sensitive to Frame delay and Frame loss Frame delay = 100 ms Frame jitter = 5 ms Frame loss = 0.01% |
| Basic Data (BSD) | General data or applications | Best effort —Sensitive to Frame loss Frame loss = 0.5% |

Tables 4a and 4b illustrate the two types of bandwidth constraint models supported by the PNC to manage bandwidth contention across different classes of traffic according to the SLA of Table 3a: (1) the Russian Doll Model (RDM) and its reservation variant; and (2) the Maximum Allocation Model (MAM). However, for a given domain, a single bandwidth constraint model (i.e., RDM or MAM) is used for Connection Admission Control.

Table 4a illustrates example classes of traffic and the bandwidth target allocated to each class. There are four class types: (1) Real Time (RT); (2) Priority Data (PD); Business Data (BD); and (4) Basic Data (BSD). RT has a class bandwidth target of less than or equal to 300 megabits per second (Mbps). PD has a class bandwidth target of less than or equal to 200 Mbps. BD has a class bandwidth target of less than or equal to 300 Mbps. BSD has a class bandwidth target of less than or equal to 200 Mbps.

TABLE 4a

| Class Type | Per-Class Bandwidth Target ($\leq$) |
|---|---|
| Real Time Data (RT) | 300 Mbps |
| Priority Data (PD) | 200 Mbps |
| Business Data (BD) | 300 Mbps |
| Basic Data (BSD) | 200 Mbps |

Table 4b illustrates example RDM and MAM allocations for an example SLA. The aggregated reservable bandwidth on a link is "sliced" into several bandwidth constraints (BCs) and each class is "allocated" bandwidth based on the scheme followed. In MAM, each Class-Type is associated with a maximum bandwidth and is allocated independently for each class. With fixed bandwidth "slice" per class type, it not possible to share unused bandwidth across class type traffic. Hence, in certain deployment scenarios, the MAM model may not achieve high link utilization. RDM assumes hierarchy between the classes, and constraints apply in a nested fashion. The highest class-type is assigned with a maximum bandwidth. The next maximum is defined for the two highest Class-Types together, and the next one is defined for the three highest Class-Types together and so on. This model generally results in very high link utilization and allows for absolute priority for chosen traffic class types. This allows for greater control for meeting SLA guarantees.

TABLE 4b

| Model | Bandwidth Constraint (BC) (Mbps) | Per-Class Allocation | Comments |
|---|---|---|---|
| Maximum Allocation Model (MAM) | BC0 = 200 BC1 = 300 BC2 = 200 BC3 = 300 | RT = BC3 PD = BC2 BD = BC1 BSD = BC0 | All class of tariff allocated fixed slice and no sharing of unused bandwidth across class. |
| Russian Doll Model (RDM) | BC0 = 1000 BC1 = 800 BC2 = 500 BC3 = 300 | RT = BC3 RT + PD = BC2 RT + PD + BD = BC1 RT + PD + BD + BSD = BC0 | There is a risk of starvation at the low end of the hierarchy but reservation extension can be used to avoid it. |

The PNC computes the optimized path on multiple QoS and per-class bandwidth constraints. This, integrated with Connection Admission Control schemes (i.e., RDM and MAM), enables service differentiation and thus limits network utilization on a per-class basis. The PNC pushes NE-specific configurations to PEs to effect traffic classification and conditioning (Meter, Shape, Drop, Mark) at the edges. Further, all the NEs along the trunk path are provisioned to realize per-hop treatment for the service traffic that is consistent and SLA compliant across the domain.

The PNC maintains an abstract representation of the provider network in the form of a topology graph. It models nodes and links with precise representation of properties such as bandwidth, delay and jitter overhead, which provide data points to the path computing engine to realize the necessary constrained based path between trunk end-point. In a simplistic example, for a path with no protection attributes associated, nodes and links not satisfying user specified constraints are pruned to form a topology sub-graph and the Constrained Shortest Path First (CSPF) algorithm is run on this topology sub-graph to compute a path between transport end-points. In cases of multiple attractive path choices, an aggregated link weight metric serves as a tie-breaker.

Table 5 illustrates PNC-supported protection and restoration schemes. Protection attributes add resiliency to transport carrying service traffic and criticality of the service traffic drives the options selected. A stand-by (back-up) is provisioned to protect traffic loss on a working (primary) path due to network outages. Additional attributes, such as link and node disjoints for working and stand-by paths, can be requested in order to protect against "correlated" failures in the networks. The link disjoint property ensures that a primary transport is protected with a backup transport that does not traverse any of the links used for primary transport, thus ensuring against link failure. The node disjoint property ensures that a primary transport is protected with a backup transport that does not traverse any of the nodes on the primary path, thus ensuring against node and link failures.

TABLE 5

| Protection Scheme | Details |
|---|---|
| Unprotected | The primary transport is not protected with a backup transport. This is best suited to transit best effort traffic. |
| 1:1 | The primary transport is protected via a non-dedicated backup transport. Under normal conditions, the backup transport carries preemptable traffic. |
| 1+1 | The primary transport is protected through a dedicated backup transport. This is ideal for transport carrying low loss-tolerant traffic. |
| N+1 | This is a shared protection scheme where a number |

TABLE 5-continued

| Protection Scheme | Details |
| --- | --- |
| | of primary (N) transports are protected by a single shared backup transport. |
| M+N | This is a variant of shared protection scheme where a number of primary transports (M) is protected by a number of shared backup transports (N). |

The first concept is a method for emulating dynamically composable communication tunnels in a network. According to the method, multiple communication tunnels are allocated. Each tunnel has multiple hardware endpoints and may be of different types of communication protocols (e.g., MPLS or PBT). An overall end-to-end tunnel is composed of the multiple tunnels. To form the overall tunnel, the multiple tunnels are connected by directly programming the hardware endpoints of each individual tunnel. The hardware endpoints may include switches and routers, and programming the endpoints may include overriding the normal routing behaviors of the hardware endpoints. Additionally, the hardware endpoints may be programmed at the direction of business plane modules residing on the networks.

Figure 10:
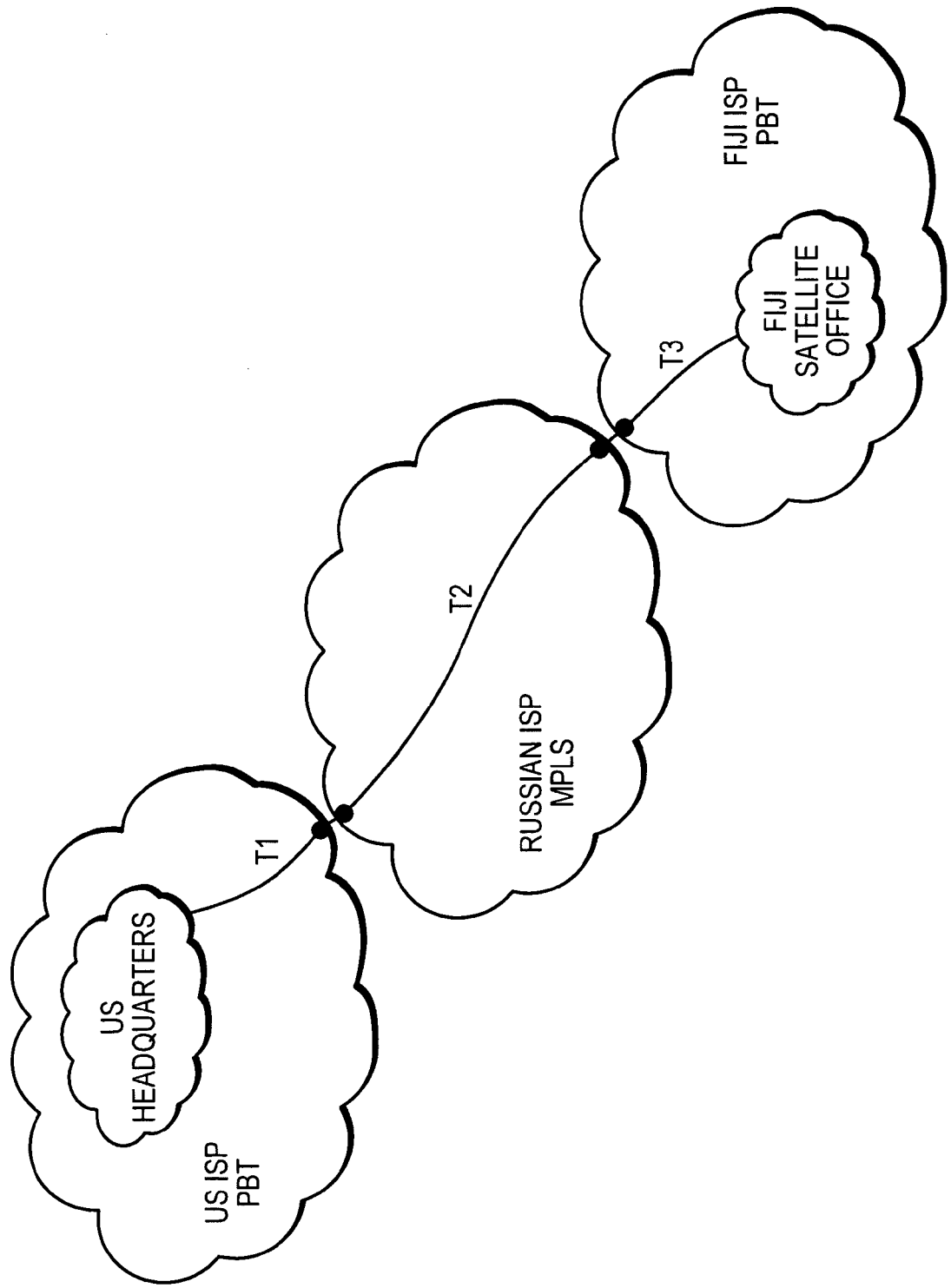
FIG. 10 is a network diagram illustrating an example Virtual Private Network (VPN).

An example of a VPN is illustrated in FIG. 10. In this example, a corporation needs to set up a VoIP connection between its headquarters in the United States (US) and a satellite office in Fiji. In this scenario, suppose the best (i.e., cheapest) route between the US Internet Service Provider (ISP) and the Fijiian ISP is through the Russian ISP's MPLS network. However, the US ISP and Fijiian ISP use PBT networks.

To establish the VoIP connection, the US ISP must procure three tunnels: a tunnel from the US headquarters to the Russian ISP network T1, a tunnel through the Russian ISP network T2, and a tunnel from the Russian ISP network to the Fiji satellite office T3. The three tunnels must then be "glued" together to form a VPN for the VoIP connection. However, the lack of interoperability between MPLS and PBT does not allow such tunnels to be connected.

Figure 11:
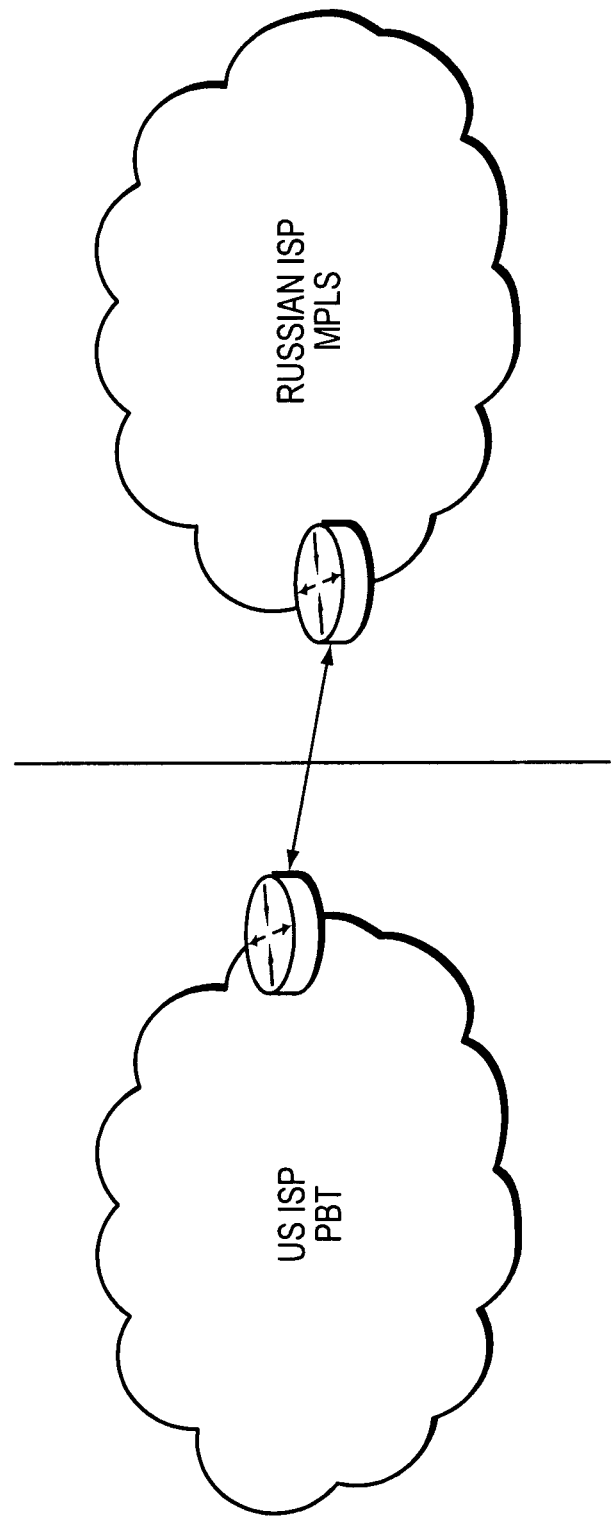
FIG. 11 is a network diagram illustrating the interface between two Internet Service Providers (ISPs).

The method allows for the connection of these tunnels by directly programming the network equipment that is present at the interfaces between each tunnel. FIG. 11 illustrates the interface between the US ISP and the Russian ISP. In each network exists a piece of network equipment, such as a switch or router. To emulate a connection of the equipment's respective tunnels, each piece of equipment must be programmed such that they handle the packets that travel over the tunnels correctly. To accomplish this, the normal routing behaviors of the switches/routers must be overridden.

Figure 12:
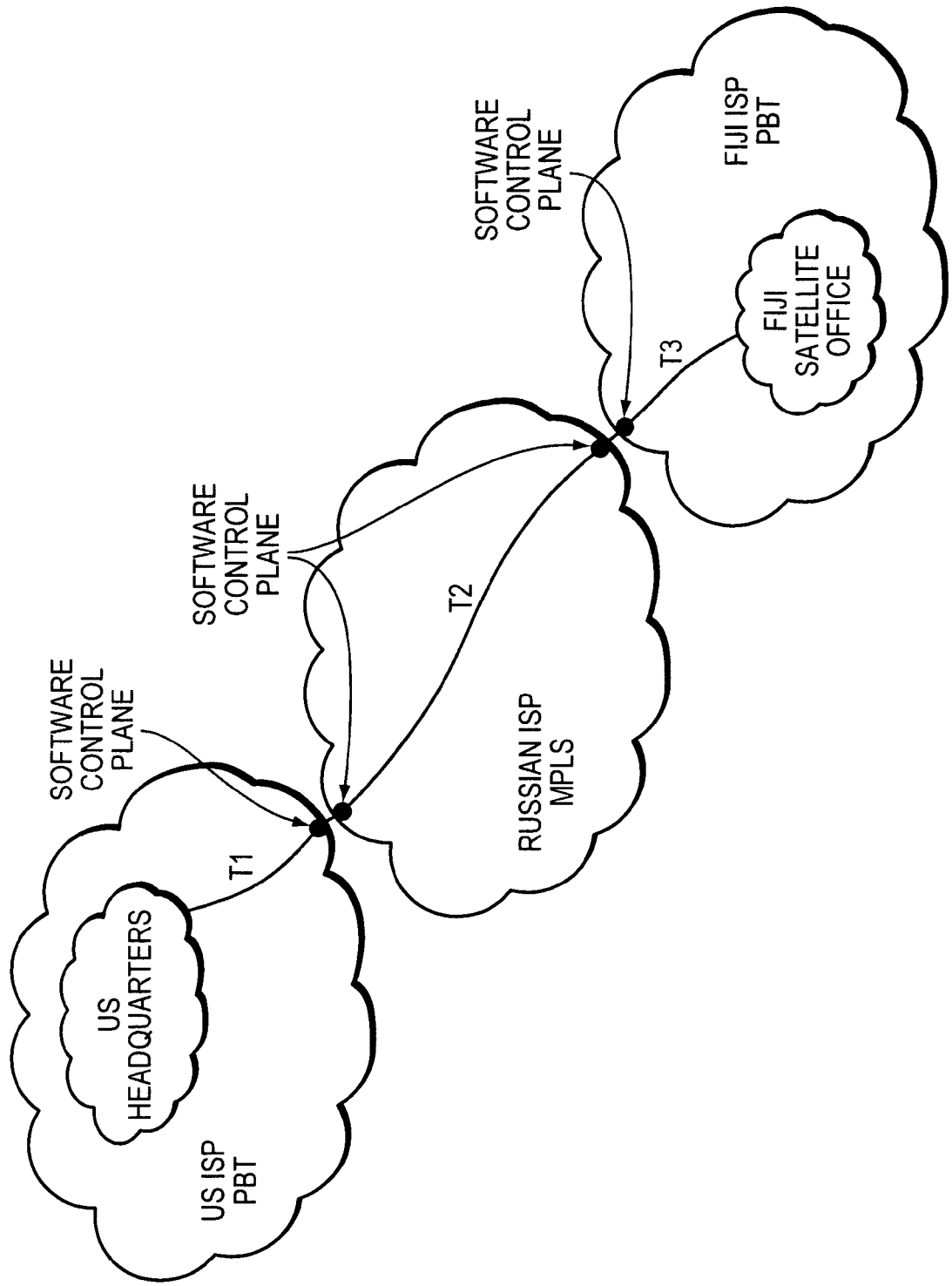
FIG. 12 is a network diagram illustrating an example embodiment software control plane's control over the ISPs of FIG. 11 according to the present invention.

FIG. 12 illustrates a high level overview of the method's control over the ISPs. The method directly programs the network equipment through a software control plane residing on each of the ISP networks. The software control plane receives a request to connect the US headquarters with the Fiji satellite office. The software control plane then examines the networks in view of the desired connection and determines what network equipment needs to be configured to create the connection. Based on that determination, the software control plane chooses the network technology (e.g., MPLS or PBT) to be used for that part of the network and, if compatible protocols are not available, directly configures each involved piece of network equipment to correctly handle packets traveling over the tunnels.

Figure 13:
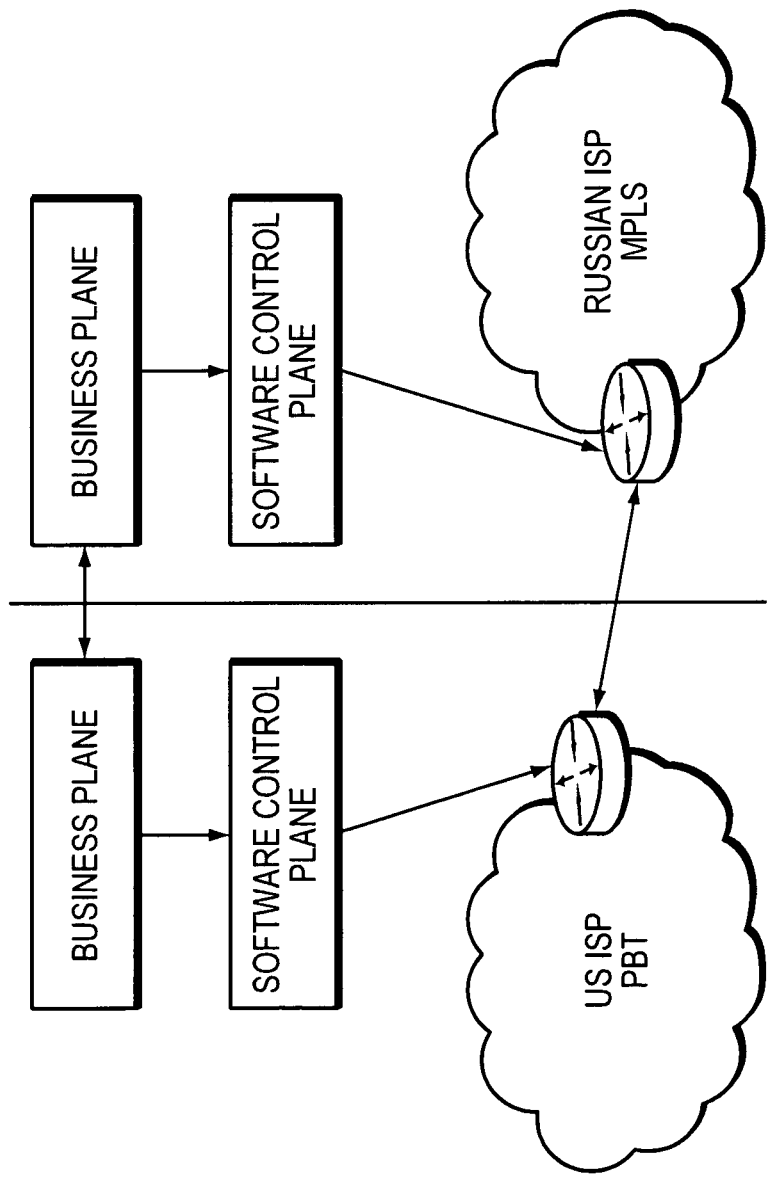
FIG. 13 is a network diagram illustrating an example embodiment software control plane in a network according to the present invention.

FIG. 13 illustrates a more detailed view of the software control plane. ISPs can communicate policies with each other over a business plane, which controls each ISP's respective software control plane, which in turn directly configures the necessary network equipment according to those network policies.

Figure 14:
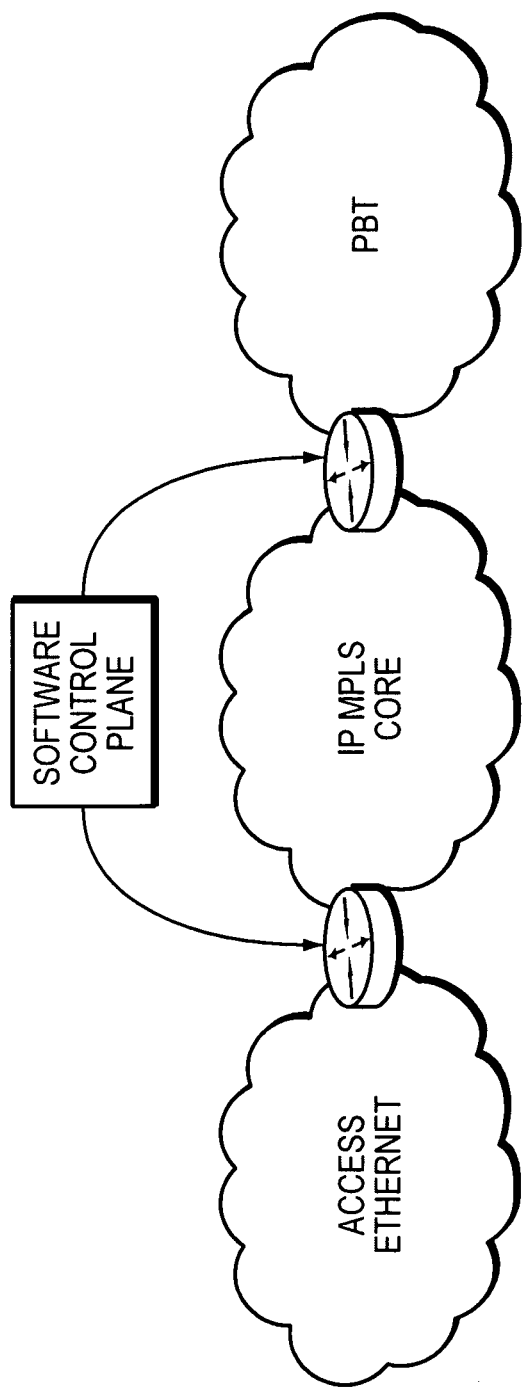
FIG. 14 is a network diagram illustrating emulation of tunnel composition by an example embodiment software control plane according to the present invention.

The method may also be used to emulate tunnel composition within a single ISP as illustrated in FIG. 14. In this situation, the software control plane may configure the network equipment residing on a single ISP to connect tunnels that use different underlying communication protocols.

Figure 15:
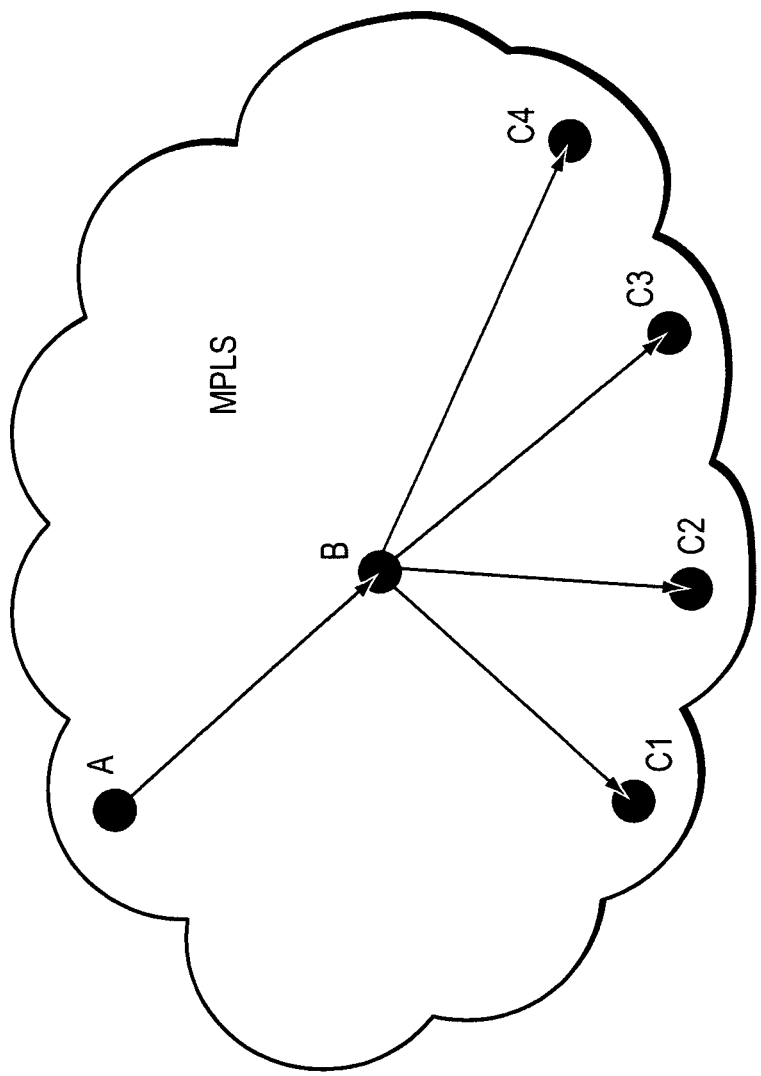
FIG. 15 is a network diagram illustrating an example emulation of the connection of tunnels of different topologies by an example embodiment software control plane according to the present invention.

Further, the software control plane can emulate the connection of tunnels that are of different topologies as illustrated in FIG. 15. MPLS does not allow tunnels of different topologies to be connected. For instance, MPLS traditionally would not allow the point to point tunnel A→B to be connected to a multicast tree B→C. However, the present method allows for the connection of such tunnels to be emulated by directly configuring the network equipment at the interface of the different tunnel topologies. Referring to FIG. 15, A→B is a point to point tunnel and B→C is a multicast tree. Example embodiments of the method can emulate a connection of A→B and B→C by directly configuring the network equipment at B to handle packets being received from the A→B tunnel such that they are sent over the B→C multicast tree. The software control plane may also emulate other tunnel connections, such as multipoint-to-point and multipoint-to-multipoint.

The second concept is a method for restoring communication tunnels in a network, such as the network of the first concept. Currently, other methods of network optimization exist, but they cannot perform rapid restoration of services. MPLS does not perform optimization and does not note reasons for establishing a particular network (e.g., lowest cost bandwidth available), but rather only knows the order of connections that were established. Further, those methods for optimization do not know how to perform restoration.

According to the method, information about multiple existing communication tunnels in the network is stored. In the event of a failure of one of the existing tunnels, new communication tunnels are allocated based on the information stored about the original tunnels. The new tunnels are then connected, by directly programming the hardware endpoints of the new tunnels, to restore the functionality of the original tunnel configuration. Additionally, the new tunnels can be connected such that the bandwidth cost is optimized.

Figure 16:
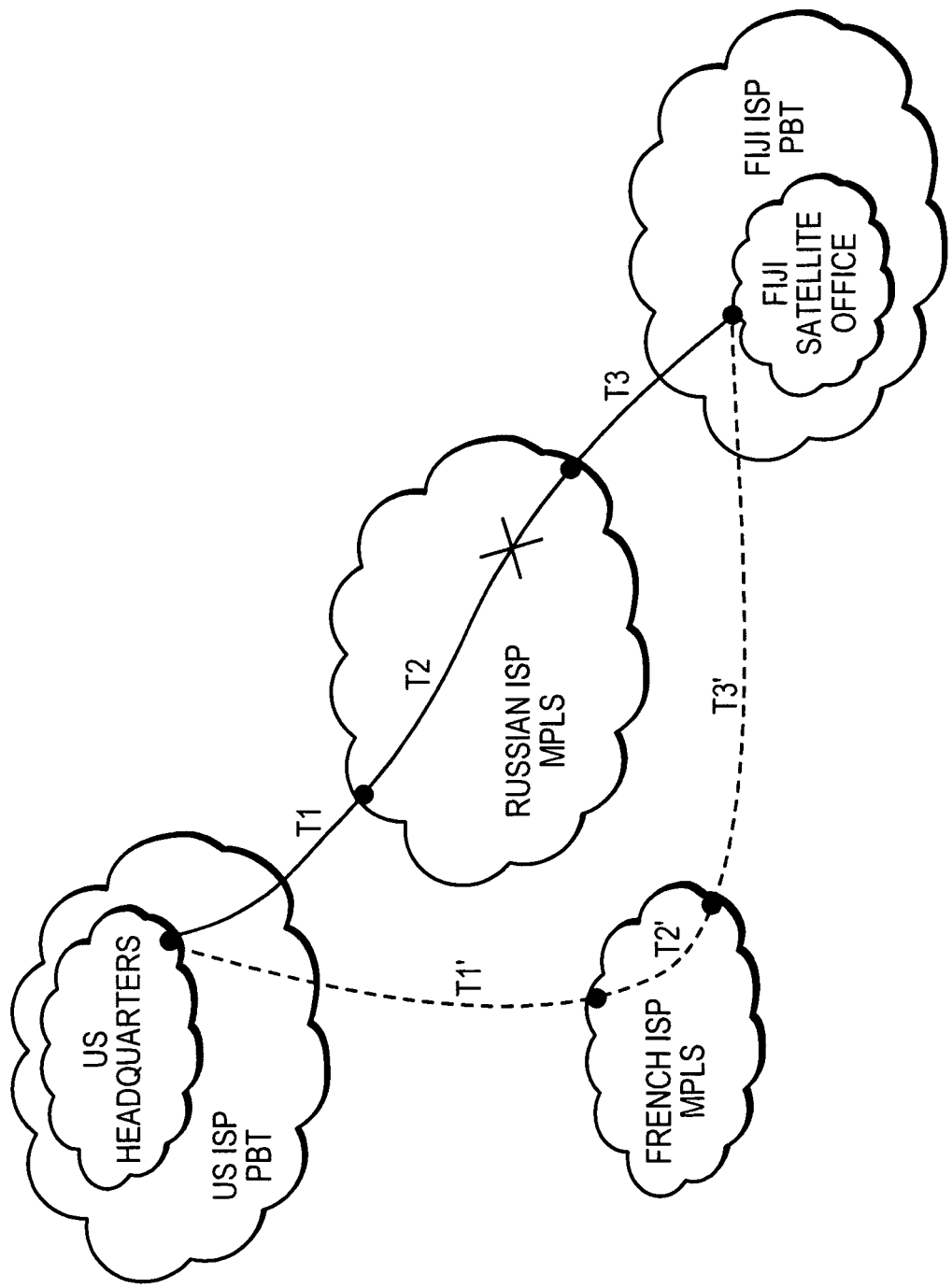
FIG. 16 is a network diagram illustrating the rerouting of a connection due to a failure in the primary connection by an example embodiment software control plane according to the present invention.

FIG. 16 illustrates a communication network, as in FIG. 10, but with the VoIP connection being rerouted through a French ISP. In this scenario, the tunnel through the Russian ISP experiences a failure. In an example embodiment of the method, at the detection of such a failure, the software control plane can reroute the traffic through a different ISP network, regardless of the type of communication protocol of the network, according to the traffic engineering rules of the protocol.

Referring to FIG. 16, the software control plane stores information about an existing connection, such as the VoIP connection between a corporation's US headquarters and its Fiji satellite office. At some point, a failure is experienced in the Russian ISP causing its tunnel to fail. Example embodiments of the method detect the failure and allocate new tunnels through a French ISP based on the information stored about the VoIP connection. The software control plane then emulates a connection of the tunnels by directly configuring the network equipment at the interfaces of the newly formed tunnels.

The third concept is a method for emulating communication tunnels in a network. According to the method, a communication tunnel is allocated having a first underlying communication protocol and multiple hardware endpoints. The tunnel is then connected to other communication tunnels having underlying communication protocols different than the first protocol by directly programming the hardware endpoints of the communication tunnel.

Figure 17:
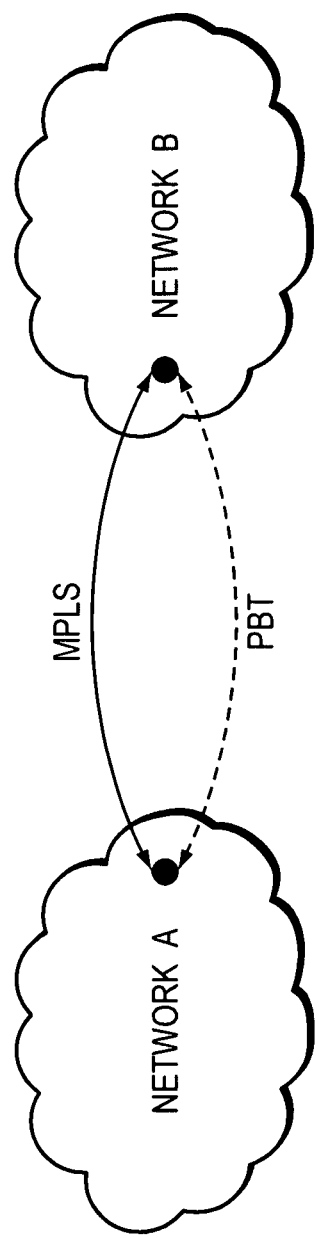
FIG. 17 is a network diagram illustrating migration of services by an example embodiment software control plane according to the present invention.

According to the method of the third concept, the software control plane of the first concept may be used for service migration. Referring to FIG. 17, an existing MPLS connection may be converted easily and quickly to a PBT connection by directly programming the network equipment associated with the different connections. The tunnel abstraction of the first concept allows for the decoupling of the desired connection between points (the "what") and the employed network protocol (the "how"); that is, requests to the software control plane for connections are concerned with what connections are desired, and the software control plane is concerned with how to configure the available network equipment to create those connections.

The fourth concept is a method for auditing network hardware resources in a network. According to the method, information about the configuration of multiple communication tunnels is stored. For each of the communication tunnels, the associated resources used by the tunnels are identified. The method then retrieves, from the identified resources, information regarding the configured state of the resources. The method then determines any discrepancies between the stored information and retrieved information. If discrepancies exist, the method then resolves the discrepancies by allocating new resources or deallocating existing resources.

Currently, there exists no central source that is responsible for resource allocation. Many individual system administrators manually add and remove resources to and from their associated connections, typically using nothing more than a spreadsheet to keep track of the resources. The tunnel abstraction of the first concept allows for an accurate accounting of these resources.

The method of the fourth concept provides a model of the allocated network equipment used in establishing the emulated connection of tunnels. The method keeps track of to whom resources have been allocated and how those resources are being used. In event of a network failure, the method can determine what network equipment is supposed to be allocated for communication, and what network equipment is actually allocated.

To determine what equipment is supposed to be allocated, the software control plane stores a high level list of equipment and how it is being used to create existing connections. To determine what equipment is actually allocated, the software control plane polls the network equipment as to whether the equipment thinks it is supposed to be allocated. The method then compares the stored list with the information retrieved from the equipment and flags any discrepancies. A discrepancy may include a piece of network equipment that is supposed to be allocated but is not, or a piece of equipment that is allocated but no longer used. If there exist any discrepancies, the software control plane can allocate additional resources if they are missing, and can deallocate extraneous resources if they are no longer needed.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   executing a software control plane control system on a processor;
   storing, by means of the executing software control plane control system, information about hardware endpoints and communication connections in a communication network, traffic engineering rules, and network policies governing the communication network;
   defining services, by means of the executing software control plane control system, to be implemented on the communication network;
   computing communication paths, by means of the executing software control plane control system, according to the stored information to implement the services,
   wherein at least one communication path computed includes two or more communication tunnels, each of the two or more communication tunnels having a respective underlying communication protocol, the two or more communication tunnels to transfer data between hardware endpoints of the two or more communication tunnels;
   programming, by means of the executing software control plane control system, the hardware endpoints of the two or more communication tunnels comprising the at least one communication path to establish the at least one communication path in the communication network,
   wherein the programming includes configuring a hardware endpoint to emulate a second communication protocol of a second communication tunnel of the two or more communication tunnels, if a first communication protocol of a first communication tunnel of the two or more communication tunnels is different from the second communication protocol;
   monitoring, by means of the executing software control plane control system, the programmed hardware endpoints and the communication connections along the at least one communication path and updating the stored information;
   recomputing, by means of the executing software control plane control system, the at least one communication path and reprogramming the hardware endpoints along the recomputed at least one communication path to adapt the at least one communication path according to changes in the stored information and the services to ensure implementation of the services; and
   migrating the services from the at least one communication path to the recomputed at least one communication path.

2. The method of claim 1, wherein the communication network is a heterogeneous communication network and is one of a multi-layer, multi-service, multi-vendor or multi-carrier communication network.

3. The method of claim 1, wherein the hardware endpoints include switches, routers, or a combination of both.

4. The method of claim 1, wherein the information about the hardware endpoints and the communication connections in the communication network includes capacity, utilization and performance metrics.

5. The method of claim 1, wherein the services are defined by attributes, the method further comprising:
   storing attributes defining the services to be implemented on the communication network; and
   computing the communication paths according to the attributes to implement the defined services.

6. The method of claim 5, wherein the attributes defining the services include service performance attributes including frame latency, delay variation, loss ratio, and bandwidth profile.

7. The method of claim 5 further comprising recomputing the at least one communication path and reprogramming the hardware endpoints along the recomputed at least one communication path to adapt the at least one communication path according to changes in the attributes of the services to ensure the implementation of the services.

8. The method of claim 1, wherein computing the at least one communication path further comprises optimizing the hardware endpoints and the communication connections in the communication network according to a quality of service and per-class bandwidth constraints.

9. The method of claim 1, wherein computing the at least one communications path includes computing at least one backup communication path that is fully redundant from the at least one communication path.

10. The method of claim 1, wherein programming the hardware endpoints along the at least one communication path includes overriding normal behaviors of the hardware endpoints.

11. The method of claim 1, wherein monitoring the programmed hardware endpoints and the communication connections along the at least one communication path further comprises monitoring for network faults, overloads or path optimization.

12. The method of claim 1, wherein recomputing the at least one communication path and reprogramming the hardware endpoints along the recomputed at least one communication path restores the at least one communication path in the communication network in an event of a failure of at least one of the communication connections in the at least one communication path.

13. The method of claim 1, wherein recomputing the at least one communication path and reprogramming the hardware endpoints along the recomputed at least one communication path optimizes the at least one communication path for at least one service in the communication network according to the stored information.

14. The method of claim 1, wherein recomputing the at least one communication path includes dynamically adjusting associated restoration time constants of the at least one communication path according to the respective restoration time constants of the communication connections of the recomputed at least one communication path.

15. The method of claim 1, wherein recomputing the at least one communication path includes recomputing according to an economic or social value associated with the at least one communication path.

16. The method of claim 1, wherein migrating the services from the at least one communication path to the recomputed at least one communication path allows maintenance of the hardware endpoints and the communication connections in the communication network without disruption to the services.

17. The method of claim 1 further comprises:
detecting failures in the hardware endpoints and the communication connections along the two or more communication tunnels; and
allocating new communication tunnels and reprogramming the hardware endpoints along the new communication tunnels to restore the two or more communication tunnels.

18. The method of claim 17, wherein allocating the new communication tunnels and reprogramming the hardware endpoints along the new communication tunnels optimizes the two or more communication tunnels according to the stored information.

19. The method of claim 17 further comprising migrating the services from the two or more communication tunnels to the new communication tunnels.

20. The method of claim 1 further comprising restoring communication tunnels in the communication network by:
allocating new communication tunnels, in an event of failure of at least one of the two or more communication tunnels, based on the stored information, each communication tunnel of the new communication tunnels having hardware endpoints; and
connecting the new communication tunnels by programming the hardware endpoints of the new communication tunnels.

21. The method of claim 1, wherein configuring the hardware endpoint to emulate the second communication tunnel in the communication network comprises:
allocating a communication tunnel having an underlying first communication protocol and hardware endpoints; and
connecting the communication tunnel to other communication tunnels having an underlying second communication protocol, different from the first communication protocol.

22. The method of claim 1, wherein computing the at least one communication path includes computing a primary path and a redundant path for communicating during a failure event of any hardware endpoint in the primary path.

23. The method of claim 1 further comprising decoupling the software control plane control system from forwarding plane hardware.

24. The method of claim 1, wherein the first and second communication tunnels are associated with a single Internet Service Provider (ISP).

25. The method of claim 1, wherein the first and second communication tunnels are associated with different Internet Service Providers.

26. The method of claim 1, wherein the first and second communication protocols are different protocols and wherein one of the first and second communication protocols is a MPLS protocol and the other of the first and second communication protocols is a PBT protocol.

27. The method of claim 1, wherein the second communication tunnel is a multicast tree, and wherein the first communication tunnel is a point to point tunnel coupled to the second communication tunnel.

28. The method of claim 1 further comprising:
tracking a percentage of misrouted paths over time; and
providing network planning information based on the tracked percentage of misrouted paths.

29. A software control plane network controller configured to control services in a communication network, the services defined to be implemented on the communication network, the software control plane network controller comprising:
a database configured to store information about hardware endpoints and communication connections in the communication network, and traffic engineering rules and network policies governing the communication network; and
a path computation module, executing on a computer, configured to:
compute at least one communication path according to the stored information to implement the services, the at least one communication path including two or more communication tunnels, each of the two or more communication tunnels having a respective underlying communication protocol, the two or more communication tunnels to transfer data between hardware endpoints of the two or more communication tunnels,
program the hardware endpoints of the two or more communication tunnels comprising the at least one communication path to establish the at least one communication path in the communication network, wherein at least one programmed hardware endpoint emulates a second communication protocol of a second communication tunnel of the two or more communication tunnels, if a first communication protocol of a first communication tunnel of the two or more communication tunnels is different from the second communication protocol, monitor the programmed hardware endpoints and the communication connections along the at least one communication path and update the stored information, recompute the at least one communication path and reprogram the hardware endpoints along the recomputed at least one communication path to adapt the at least one communication path according to changes in the stored information and the services to ensure implementation of the services, and migrate the services from the at least one communication path to the recomputed at least one communication path.

30. The software control plane network controller of claim 29, wherein the communication network is a heterogeneous communication network and is one of a multi-layer, multi-service, multi-vendor or multi-carrier communication network.

31. The software control plane network controller of claim 29, wherein the hardware endpoints include switches, routers, or a combination of both.

32. The software control plane network controller of claim 29, wherein the information about the hardware endpoints and the communication connections in the communication network includes capacity, utilization and performance metrics.

33. The software control plane network controller of claim 29, wherein the path computation module is further configured to compute the at least one communication path according to attributes stored in the database, the attributes defining the services to be implemented on the network.

34. The software control plane network controller of claim 33, wherein the attributes defining the services include service performance attributes including frame latency, delay variation, loss ratio, and bandwidth profile.

35. The software control plane network controller of claim 33, wherein the path computation module is further configured to recompute the at least one communication path and reprogram the hardware endpoints along the recomputed at least one communication path to adapt the at least one communication path according to changes in the attributes of the services to ensure the implementation of the services.

36. The software control plane network controller of claim 29, wherein the path computation module is further configured to optimize the hardware endpoints and the communication connections in the communication network according to quality of service and per-class bandwidth constraints.

37. The software control plane network controller of claim 29, wherein the path computation module is further configured to compute backup communication paths that are fully redundant from the at least one communication path.

38. The software control plane network controller of claim 29, wherein the path computation module is further configured to program the hardware endpoints along the at least one communication path by overriding normal behaviors of the hardware endpoints.

39. The software control plane network controller of claim 29, wherein the path computation module is further configured to monitor the programmed hardware endpoints and the communication connections along the at least one communication path for network faults, overloads or path optimization.

40. The software control plane network controller of claim 29, wherein the path computation module is further configured to recompute the at least one communication path and reprogram the hardware endpoints along the recomputed at least one communication path to restore the at least one communication path in the communication network in an event of a failure of at least one of the communication connections in the at least one communication path.

41. The software control plane network controller of claim 29, wherein the path computation module is further configured to recompute the at least one communication path and reprogram the hardware endpoints along the recomputed at least one communication path to optimize the at least one communication path for at least one service in the communication network according to the stored information.

42. The software control plane network controller of claim 29, wherein the path computation module is further configured to dynamically adjust associated restoration time constants of the at least one communication path according to the respective restoration time constants of the communication connections of the recomputed at least one communication path.

43. The software control plane network controller of claim 29, wherein the path computation module is further configured to recompute the at least one communication path according to an economic or social value associated with the at least one communication path.

44. The software control plane network controller of claim 29, wherein the software control plane network controller is further configured to migrate the services to allow maintenance of the hardware endpoints and the communication connections in the communication network without disruption to the services.

45. The software control plane network controller of claim 29, wherein the path computation module is configured to:

detect failures in the hardware endpoints and the communication connections along the two or more communication tunnels, and allocate new communication tunnels and reprogram the hardware endpoints along the new communication tunnels to restore the two or more communication tunnels.

46. The software control plane network controller of claim 45, wherein the path computation module is further configured to allocate the new communication tunnels and reprogram the hardware endpoints along the new communication tunnels to optimize the two or more communication tunnels according to the stored information.

47. The software control plane network controller of claim 45, wherein the software control plane network controller is further configured to migrate services from the two or more communication tunnels to the new communication tunnels.

48. The software control plane network of claim 29, wherein the path computation module is configured to compute the at least one communication path by computing a primary path and a redundant path for communicating during a failure event of any hardware endpoint in the primary path.

49. The software control plane network of claim 29, wherein the software control plane control system is decoupled from forwarding plane hardware.

50. The software control plane network of claim 29, wherein the first and second communication tunnels are associated with a single Internet Service Provider (ISP).

51. The software control plane network of claim 29, wherein the first and second communication tunnels are associated with different Internet Service Providers.

52. The software control plane network of claim 29, wherein the first and second communication protocols are different protocols and wherein one of the first and second communication protocols is a MPLS protocol and the other of the first and second communication protocols is a PBT protocol.

53. The software control plane network of claim 29, wherein the second communication tunnel is a multicast tree, and wherein the first communication tunnel is a point to point tunnel coupled to the second communication tunnel.

54. The software control plane network of claim 29, wherein the path computation module is configured to:
  track a percentage of misrouted paths over time; and
  provide network planning information based on the tracked percentage of misrouted paths.

* * * * *